US008635557B2

(12) United States Patent
Geise et al.

(10) Patent No.: US 8,635,557 B2
(45) Date of Patent: *Jan. 21, 2014

(54) SYSTEM TO NAVIGATE WITHIN IMAGES SPATIALLY REFERENCED TO A COMPUTED SPACE

(75) Inventors: Doran J. Geise, Fort Collins, CO (US); Keith G. Croteau, Fort Collins, CO (US)

(73) Assignee: 205 Ridgmont Solutions, L.L.C., Dover, DE (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/283,149

(22) Filed: Sep. 10, 2008

(65) Prior Publication Data

US 2009/0076719 A1    Mar. 19, 2009

Related U.S. Application Data

(63) Continuation of application No. 10/513,387, filed as application No. PCT/US03/14378 on May 5, 2003, now Pat. No. 7,827,507.

(60) Provisional application No. 60/377,642, filed on May 3, 2002.

(51) Int. Cl.
*G06F 3/048* (2013.01)

(52) U.S. Cl.
USPC ............................ 715/850; 715/851; 715/855

(58) Field of Classification Search
USPC ......... 715/720–721, 738–739, 825, 829, 831, 715/835, 848–855, 863; 701/436, 533, 426, 701/454, 530
See application file for complete search history.

(56) References Cited

U.S. PATENT DOCUMENTS

| 4,086,632 | A |   | 4/1978  | Liess ............................. 364/444 |
| 4,760,390 | A | * | 7/1988  | Maine et al. .................. 345/473 |
| 4,926,336 | A |   | 5/1990  | Yamada ........................ 364/444 |
| 4,937,753 | A |   | 6/1990  | Yamada ........................ 364/449 |
| 4,954,958 | A |   | 9/1990  | Savage et al. ................. 364/444 |
| 4,962,458 | A |   | 10/1990 | Verstraete |
| 4,962,468 | A |   | 10/1990 | Verstraete .................... 364/443 |

(Continued)

FOREIGN PATENT DOCUMENTS

| EP | 0581659 A1 | 7/1993 | ............. G01C 23/00 |
| EP | 0581659 B1 | 7/1993 | ............. G01C 23/00 |

(Continued)

OTHER PUBLICATIONS

Lippman, "Movie-Maps: An APplication of the Optical Videodisc to Computer Graphcis", SIGGRAPH '80 Proceedings of the 7th annual conference on Computer graphics and interactive techniques, ACM New York, NY, USA copyright 1980.*

(Continued)

*Primary Examiner* — Omar Abdul-Ali
*Assistant Examiner* — Andrew Tank
(74) *Attorney, Agent, or Firm* — Woodcock Washburn LLC

(57) ABSTRACT

A system for navigating images spatially referenced to a plurality of location coordinates from at least one coordinate location within a computed space provides travel with a non-linear itinerary. Specifically, serial navigation of a plurality of geographic images spatially referenced to location coordinates of a geo-planar space from a selected coordinate location within each prior geographic image.

37 Claims, 37 Drawing Sheets

(56) References Cited

U.S. PATENT DOCUMENTS

| | | | |
|---|---|---|---|
| 4,984,168 A | 1/1991 | Neukrichner et al. | 364/449 |
| 5,031,104 A | 7/1991 | Ikeda et al. | 364/449 |
| 5,041,983 A | 8/1991 | Nakahara et al. | 364/449 |
| 5,067,081 A | 11/1991 | Person | 364/444 |
| 5,115,399 A | 5/1992 | Nimura et al. | 364/449 |
| 5,168,452 A | 12/1992 | Yamada et al. | 364/449 |
| 5,170,353 A | 12/1992 | Verstraete | 364/449 |
| 5,172,321 A | 12/1992 | Ghaem et al. | 364/444 |
| 5,189,430 A | 2/1993 | Yano et al. | 342/457 |
| 5,191,406 A | 3/1993 | Brandestini et al. | 358/22 |
| 5,191,532 A | 3/1993 | Moroto | 364/449 |
| 5,231,584 A | 7/1993 | Nimura et al. | 364/444 |
| 5,270,937 A | 12/1993 | Link et al. | 364/449 |
| 5,274,387 A | 12/1993 | Kakihara et al. | G01S 3/02 |
| 5,293,163 A | 3/1994 | Kakihara et al. | 340/995 |
| 5,406,619 A | 4/1995 | Akhteruzzaman et al. | 379/95 |
| 5,408,217 A | 4/1995 | Sanderford, Jr. | 348/506 |
| 5,414,462 A | 5/1995 | Veatch | 348/135 |
| 5,422,814 A | 6/1995 | Sprague et al. | 364/449 |
| 5,440,301 A | 8/1995 | Evans | 348/970.11 |
| 5,442,342 A | 8/1995 | Kung | 340/825.34 |
| 5,450,344 A | 9/1995 | Woo et al. | 364/449 |
| 5,451,757 A | 9/1995 | Heath, Jr. | 235/382 |
| 5,471,392 A | 11/1995 | Yamashita | 364/443 |
| 5,499,294 A | 3/1996 | Friedman | 360/18 |
| 5,506,644 A | 4/1996 | Suzuki et al. | 354/106 |
| 5,508,736 A | 4/1996 | Cooper | 348/144 |
| 5,521,587 A | 5/1996 | Sawabe et al. | 340/815.45 |
| 5,523,765 A | 6/1996 | Ichikawa | 342/451 |
| 5,526,291 A | 6/1996 | Lennen | 364/581.82 |
| 5,530,759 A | 6/1996 | Braudaway et al. | 380/54 |
| 5,535,001 A | 7/1996 | Tajima et al. | |
| 5,535,011 A | 7/1996 | Yamagami et al. | 358/335 |
| 5,541,845 A | 7/1996 | Klein | 364/449 |
| 5,559,707 A | 9/1996 | DeLorme et al. | 364/443 |
| 5,768,380 A | 6/1998 | Rosauer et al. | 380/21 |
| 5,802,492 A | 9/1998 | DeLorme et al. | 701/200 |
| 5,878,421 A | 3/1999 | Ferrei et al. | 707/100 |
| 5,884,219 A * | 3/1999 | Curtwright et al. | 701/213 |
| 5,982,298 A | 11/1999 | Lappenbusch et al. | |
| 5,991,690 A * | 11/1999 | Murphy | 701/454 |
| 6,035,330 A | 3/2000 | Astiz et al. | 709/218 |
| 6,049,755 A * | 4/2000 | Lou et al. | 701/455 |
| 6,148,090 A | 11/2000 | Narioka | 382/113 |
| 6,163,749 A * | 12/2000 | McDonough et al. | 701/208 |
| 6,195,122 B1 | 2/2001 | Vincent | |
| 6,199,014 B1 | 3/2001 | Walker et al. | 701/211 |
| 6,240,360 B1 | 5/2001 | Phelan | 701/208 |
| 6,263,343 B1 | 7/2001 | Hirano | 707/104 |
| 6,282,362 B1 | 8/2001 | Murphy et al. | 386/46 |
| 6,282,489 B1 | 8/2001 | Bellesfield et al. | |
| 6,298,303 B1 | 10/2001 | Khavakh et al. | 701/289 |
| 6,321,158 B1 * | 11/2001 | DeLorme et al. | 701/426 |
| 6,341,254 B1 | 1/2002 | Okude et al. | 701/208 |
| 6,356,283 B1 | 3/2002 | Guedalia | 345/760 |
| 6,360,168 B1 * | 3/2002 | Shimabara | 701/436 |
| 6,388,688 B1 | 5/2002 | Schileru-Key | |
| 6,462,674 B2 | 10/2002 | Ohmura et al. | |
| 6,540,615 B2 | 4/2003 | Tanaka et al. | |
| 6,754,400 B2 * | 6/2004 | Florin et al. | 382/285 |
| 6,826,472 B1 * | 11/2004 | Kamei et al. | 701/426 |
| 6,868,169 B2 | 3/2005 | Staas et al. | |
| 6,895,126 B2 | 5/2005 | Di Bernardo et al. | |
| 7,050,102 B1 * | 5/2006 | Vincent | 348/333.02 |
| 7,110,592 B2 | 9/2006 | Kotake et al. | |
| 7,239,760 B2 | 7/2007 | Di Bernardo et al. | |
| 7,460,953 B2 * | 12/2008 | Herbst et al. | 701/438 |
| 7,577,316 B2 | 8/2009 | Di Bernardo et al. | |
| 7,805,025 B2 | 9/2010 | DiBernardo et al. | |
| 7,813,596 B2 | 10/2010 | Di Bernardo et al. | |
| 7,827,507 B2 * | 11/2010 | Geise et al. | 715/850 |
| 2002/0023271 A1 | 2/2002 | Augenbraun et al. | 725/109 |
| 2002/0038180 A1 | 3/2002 | Bellesfield et al. | 701/202 |
| 2002/0141655 A1 | 10/2002 | Niemi et al. | |
| 2003/0182052 A1 * | 9/2003 | DeLorme et al. | 701/201 |
| 2007/0176796 A1 | 8/2007 | Bliss et al. | |
| 2007/0249368 A1 | 10/2007 | Bailly et al. | |
| 2007/0282792 A1 | 12/2007 | Bailly et al. | |

FOREIGN PATENT DOCUMENTS

| | | | |
|---|---|---|---|
| EP | 0841537 A2 | 5/1996 | G01C 21/20 |
| EP | 0581659 B1 | 3/1997 | G01C 23/00 |
| EP | 0775891 A2 | 5/1997 | G01C 21/20 |
| EP | 0 581 659 | 6/1997 | |
| EP | 0802516 A2 | 10/1997 | G08G 1/0969 |
| EP | 0 841 537 | 11/1997 | |
| EP | 0775891 A3 | 11/1997 | G01C 21/20 |
| EP | 0775891 B1 | 5/1999 | G01C 21/20 |
| EP | 0841537 A3 | 10/1999 | G01C 21/20 |
| EP | 0 775 891 | 12/1999 | |
| EP | 0 854 124 | 5/2000 | |
| EP | 1 004 852 | 5/2000 | |
| EP | 0845124 A1 | 5/2000 | G06F 17/30 |
| EP | 0845124 B1 | 5/2000 | G06F 17/30 |
| EP | 1004852 A2 | 5/2000 | G01C 21/34 |
| EP | 1024347 A1 | 6/2000 | G01C 21/36 |
| EP | 1 024 347 | 8/2000 | |
| EP | 1 118 837 | 7/2001 | |
| EP | 1118837 A2 | 7/2001 | G01C 21/30 |
| EP | 1004852 A3 | 8/2001 | G01C 21/34 |
| EP | 0 802 516 | 8/2004 | |
| WO | WO 97/07467 | 2/1997 | G06F 17/30 |
| WO | WO 98/00976 | 1/1998 | |
| WO | WO 01/44914 | 6/2001 | |
| WO | WO 0144914 A1 | 6/2001 | |
| WO | WO 01/67200 | 9/2001 | |
| WO | WO 0167200 A2 | 9/2001 | |
| WO | WO 01/94882 | 12/2001 | |
| WO | WO 0194882 A2 | 12/2001 | |
| WO | WO 02/61681 | 8/2002 | |

OTHER PUBLICATIONS

Chen, "QuickTime VR—An Image-Based Approach to Virtual Environment Navigation", Proceedings of the 22nd annual conference on Computer Graphics and Interactive Techniques (SIGGRAPH'95), pp. 29-38, copyright ACM 1995.*

Butz et al., "A Hybrid Indoor Navigation System", Proceedings of the 6th International Conference on Intelligent User Interfaces, pp. 25-32, copyright ACM 2001.*

"MSN MapPoint—Home Page", http://www.mappoint.com, printed May 3, 2002, 1 page.

"Internet Pictures Corporation—World Leader in Dynamic Imaging", wysisyg://85/http://www.ipix.com, printed May 3, 2002, 1 page.

"Red Hen Systems, Inc.—Home", wysiwyg://87/http:://www.redhensystems.com/, printed May 3, 2002, 1 page.

"GlobeXplorer", wysiwyg:3/http://www.globexplorer.com, printed May 5, 2002, 1 page.

"S.N.V.", http://www.snv.fr, printed May 3, 2002, 1 page.

"Realator.Org Home Page", wysiwyg://10/http://www.realtor.org . . . gn.nsf/pages/HomePage?OpenDocument, printed May 3, 2002, 1 page.

"Orbitz: Airline Tickets, Hotels, Car Rentals, Travel Deals", wysiwyg://15/http://www.orbitz.com, printed May 3, 2002, 1 page.

"Expedia Travel—discount airfare . . . , vacation packages, cruises, maps", http://www.expedia.com/Default.asp, printed May 3, 2002, 1 page.

"24/7 Travel Professionals—Trip.com—1.800.TRIP.com", wysiwyg://29./http://www.trip.com./trs.trip/home/index_.xs1, printed May 3, 2002, 2 pages.

National Phase U.S. Appl. No. 10/513,387, filed Nov. 2, 2004.

A9.com, Inc., A9.com Maps (http//maps.a9.com/) downloaded Dec. 30, 2005, 3 pages Amazon.com.

Welcome to the World-Wide Media eXchange !, World-Wide Media eXchange: WWMX, http://wwmx.org/, printed May 9, 2008, two total pages.

Links, World-Wide Media eXchange: Links, http://wwmx.org/Links.aspx/, printed May 9, 2008, two total pages.

(56) References Cited

OTHER PUBLICATIONS http://maps.goolge.com/maps?hl=en&tab=wl, Google Maps, NAVTEQ, copyright 2008, downloaded Jul. 25, 2008, three total pages.
Moore et al., "Using Java to Interact With Geo-referenced VRML Within a Virtual Field Course", Computers and Geosciences, Dec. 1999, vol. 25, No. 10, pp. 1125-1136.
Provisional U.S. Appl. No. 60/513,387, filed May 3, 2002.
Patent Cooperation Treaty Patent Application No. PCT/US03/14378, filed May 5, 2003.
OA mailed Feb. 20, 2008 for U.S. Appl. No. 10/513,387.
Response to OA mailed Feb. 20, 2008 for U.S. Appl. No. 10/513,387.
OA mailed Nov. 28, 2008 for U.S. Appl. No. 10/513,387.
Response to OA mailed Nov. 28, 2008 for U.S. Appl. No. 10/513,387.
OA mailed Jul. 1, 2009 for U.S. Appl. No. 10/513,387.
Response to OA mailed Jul. 1, 2009 for U.S. Appl. No. 10/513,387.
OA mailed Feb. 24, 2010 for U.S. Appl. No. 10/513,387.
Response to OA mailed Feb. 24, 2010 for U.S. Appl. No. 10/513,387.
Notice of Allowance for U.S. Appl. No. 10/513,387 mailed Sep. 2, 2010.
http://www.bcrumbz.com, BreadCrumbz, Final: BreadCrumbz in Google ADC Top 20, downloaded Sep. 26, 2008, three total pages.
http://maps.google.com/maps?hl=en&tab=w1, downloaded Aug. 7, 2009, five total pages.
http://ww.mapquest.com, downloaded Apr. 10, 2011, four total pages.
http://ww.maps.google.com, downloaded Apr. 10, 2011, four total pages.
http://ww.microsoft.com/maps/streetside.aspx, downloaded Apr. 10, 2011, four total pages.
http://content.mqcdn.com/winston-release10-19/cdn/toolkit/lite/images/streetview/icon-36, originally downloaded Dec. 24, 2010, one total page.

* cited by examiner

| X | Y | NSX | NSY | NSZ |
|---|---|---|---|---|
| 27 | 54 | 100345 | 223467 | 10234 |
| 23 | 100 | 255621 | 2458748 | 25698 |

FIG 2

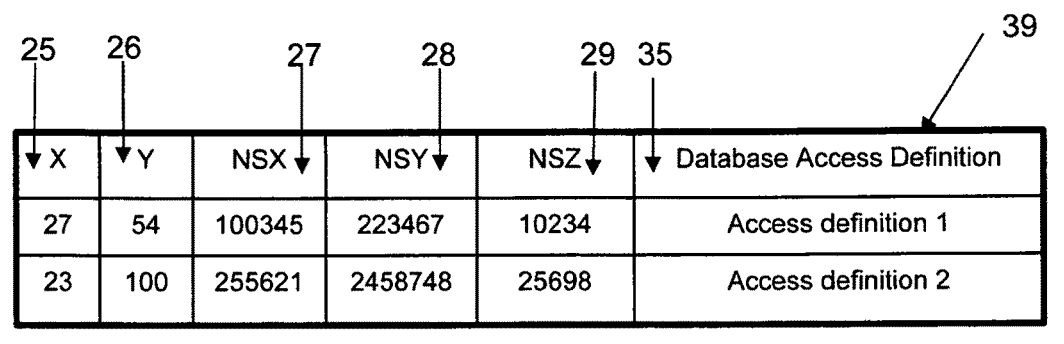

| X | Y | NSX | NSY | NSZ | Database Access Definition |
|---|---|---|---|---|---|
| 27 | 54 | 100345 | 223467 | 10234 | Access definition 1 |
| 23 | 100 | 255621 | 2458748 | 25698 | Access definition 2 |

FIG 6

| Geoflicklink:Table | | |
|---|---|---|
| Field | Data Type | Description |
| ID | AutoNumber | |
| Photo_ID | Number | |
| URL | Memo | |
| LINKX | Number | |
| LINKY | Number | |
| FLICK_ID | Number | |

FIG 11 geoflicklink:Table

| ID | PHOTO_ID | URL | LINKX | LINKY | FLICK_ID |
|----|----------|-----|-------|-------|----------|
| 1 | 15 | http://www.ellicottvilleinn.com | 22 | 51 | 1 |
| 2 | 32 | http://www.ellicottvillenycom | 305 | 112 | 1 |
| 3 | 28 | http://www.ellicottvilleinn.com | 280 | 96 | 1 |

FIG 12

Geoflick:Table

| Field | Data Type | Description |
|---|---|---|
| FLICK_ID | Number | |
| PHOTO_ID | Number | |
| PREVIOUS | Number | |
| NEXT | Number | |
| AZIMUTH | Number | |
| DATE | Number | |
| PHOTONAME | Text | |
| KEY | AutoNumber | |
| X | Number | |
| Y | Number | |

FIG 13

Geoflick:Table

| FLICK_ID | PHOTO_ID | PREV | NEXT | AZIMUTH | DATE | PHOTONAME | KEY | X | Y |
|---|---|---|---|---|---|---|---|---|---|
| 1 | 12 | 36 | 13 | 70 | 20020228 | P0001312.JPG | 5 | 4682695.097 | 691835.546 |
| 1 | 13 | 12 | 14 | 70 | 20020228 | P0001313.JPG | 6 | 4682721.237 | 691874.325 |
| 1 | 14 | 13 | 15 | 70 | 20020228 | P0001314.JPG | 7 | 4682743.543 | 691909.702 |
| 1 | 15 | 14 | 16 | 70 | 20020228 | P0001315.JPG | 8 | 4682757.998 | 691934.056 |
| 1 | 16 | 15 | 17 | 70 | 20020228 | P0001316.JPG | 10 | 4682765.314 | 691951.491 |
| 1 | 17 | 16 | 18 | 70 | 20020228 | P0001317.JPG | 11 | 4682776.014 | 691965.118 |
| 1 | 18 | 17 | 19 | 70 | 20020228 | P0001318.JPG | 12 | 4682789.441 | 691988.179 |
| 1 | 19 | 18 | 20 | 70 | 20020228 | P0001319.JPG | 13 | 4682800.23 | 692003.364 |
| 1 | 20 | 19 | 24 | 70 | 20020228 | P0001320.JPG | 15 | 4682813.754 | 692029.136 |
| 1 | 21 | 20 | 22 | 70 | 20020228 | P0001321.JPG | 19 | 4682828.464 | 692049.742 |
| 1 | 22 | 21 | 23 | 70 | 20020228 | P0001322.JPG | 20 | 4682840.031 | 692071.116 |
| 1 | 23 | 22 | 24 | 70 | 20020228 | P0001323.JPG | 21 | 4682869.105 | 692117.674 |
| 1 | 24 | 23 | 25 | 240 | 20020228 | P0001324.JPG | 22 | 4682855.619 | 692127.062 |

FIG 14

| link:Table | | |
|---|---|---|
| Field | Data Type | Description |
| ID | AutoNumber | |
| PHOTO_ID | Number | |
| URL | Memo | |
| LINKX | Number | |
| LINKY | Number | |

FIG 15 link:Table

| ID | PHOTO_ID | URL | LINKX | LINKY |
|----|----------|-----|-------|-------|
| 1 | 5 | http://www.balloonsrestaurant.com | 267 | 147 |
| 3 | 8 | http://www.dinas.com | 220 | 134 |
| 4 | 81 | http://www.holidayvalley.com | 77 | 149 |
| 5 | 48 | http://www.fitzweller.com | 313 | 95 |
| 6 | 5 | http://www.ellicottvillebrewing.com | 356 | 137 |
| 7 | 80 | http://www.century21towncountry.com/rentals | 266 | 128 |

FIG 16 hyper:Table

| Field | Data Type | Description |
|---|---|---|
| ID | AutoNumber | |
| PHOTO_ID | Number | |
| hyperX | Number | |
| hyperY | Number | |
| LOCATION_ID | Number | |
| NEWPHOTO_ID | Number | |

FIG 17

| hyper:Table | | | | | |
|---|---|---|---|---|---|
| ID | PHOTO_ID | hyperX | hyperY | LOCATION_ID | NEWPHOTO_ID |
| 11 | 8 | 284 | 84 | 1 | 48 |
| 12 | 9 | 94 | 93 | 1 | 48 |
| 13 | 9 | 155 | 161 | 5 | 94 |
| 1 | 48 | 242 | 107 | 6 | 8 |
| 14 | 48 | 199 | 123 | 5 | 98 |
| 2 | 57 | 81 | 132 | 2 | 61 |
| 3 | 61 | 296 | 160 | 1 | 57 |
| 4 | 63 | 201 | 110 | 3 | 80 |
| 5 | 75 | 148 | 96 | 4 | 89 |
| 6 | 80 | 80 | 81 | 2 | 63 |
| 7 | 81 | 141 | 88 | 6 | 9 |
| 15 | 81 | 80 | 88 | 5 | 94 |

FIG 18 location:Table

| Field | Data Type | Description |
|---|---|---|
| LOCATION_ID | Number | |
| Y | Number | |
| X | Number | |
| SELECTABLE | Number | |

FIG 19 location:Table

| LOCATION_ID | X | Y | SELECTABLE |
|---|---|---|---|
| 1 | 4681945.049 | 651519.66 | 1 |
| 2 | 4681576.985 | 689996.024 | 1 |
| 3 | 4680792.221 | 691034.724 | 1 |
| 4 | 4680600.384 | 692566.45 | 1 |
| 5 | 4682710.32 | 691885.36 | 1 |
| 6 | 4682786.851 | 692014.201 | 0 |

FIG 20 photo:Table

| Field | Data Type | Description |
|---|---|---|
| LOCATION_ID | Number | |
| PHOTO_ID | Number | |
| PREVIOUS | Number | |
| NEXT | Number | |
| AZIMUTH | Number | |
| DATE | Number | |
| PHOTONAME | Text | |
| KEY | AutoNumber | |

FIG 21 photo:Table

| LOCATION_ID | PHOTO_ID | PREVIOUS | NEXT | AZIMUTH | DATE | PHOTONAME | KEY |
|---|---|---|---|---|---|---|---|
| 1 | 50 | 58 | 48 | 0 | 20020225 | P0001250.jpg | 5 |
| 1 | 48 | 50 | 51 | 36 | 20020225 | P0001248.jpg | 6 |
| 1 | 51 | 48 | 52 | 72 | 20020225 | P0001251.jpg | 7 |
| 1 | 52 | 51 | 53 | 108 | 20020225 | P0001252.jpg | 8 |
| 1 | 53 | 52 | 54 | 144 | 20020225 | P0001253.jpg | 10 |
| 1 | 54 | 53 | 55 | 180 | 20020225 | P0001254.jpg | 11 |
| 1 | 55 | 54 | 56 | 216 | 20020225 | P0001255.jpg | 12 |
| 1 | 56 | 55 | 57 | 252 | 20020225 | P0001256.jpg | 13 |
| 1 | 57 | 56 | 58 | 288 | 20020225 | P0001257.jpg | 15 |
| 1 | 58 | 57 | 50 | 324 | 20020225 | P0001258.jpg | 19 |
| 2 | 59 | 58 | 60 | 0 | 20020225 | P0001259.jpg | 20 |

FIG 22

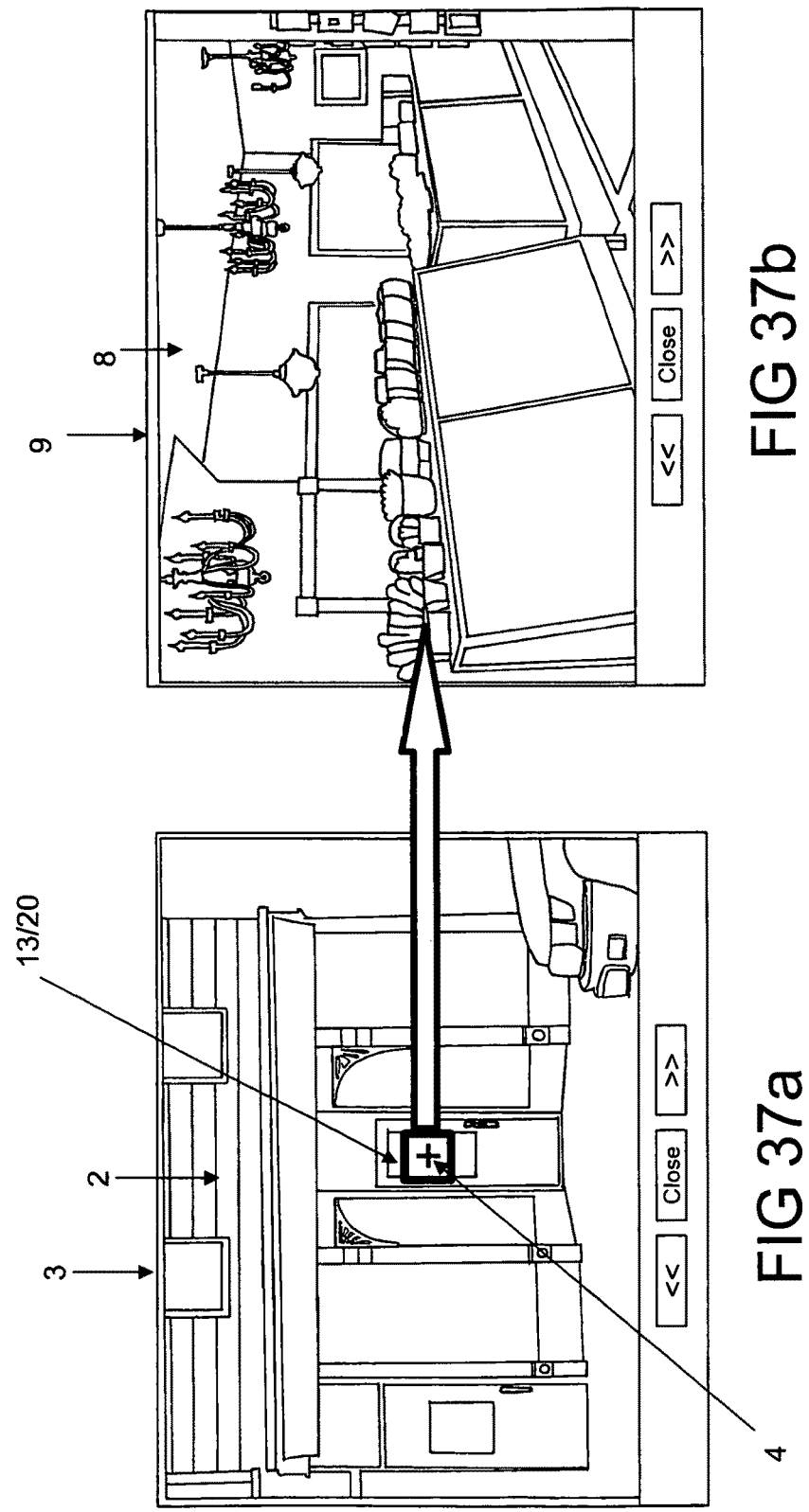

SYSTEM TO NAVIGATE WITHIN IMAGES SPATIALLY REFERENCED TO A COMPUTED SPACE

This U.S. patent application is a continuation of U.S. patent application Ser. No. 10/513,387, filed Nov. 2, 2004, now U.S. Pat. No. 7,827,507, issued Nov. 2, 2010, which was the National Stage of International Patent Cooperation Treaty Application No. PCT/US2003/014378, filed May 5, 2003, which claims the benefit of U.S. Provisional Patent Application No. 60/377,642 filed May 3, 2002, each hereby incorporated by reference herein.

I. TECHNICAL FIELD

A system for navigating visual information such as images spatially referenced to location coordinates within a computed navigation space from an origin coordinate location within the computed navigation space to provide computed travel having a non-linear itinerary. Specifically, non-linear serial navigation of a plurality of geographic images spatially referenced to location coordinates within a geographic computed navigation space from a coordinate location selected within each prior geographic image.

II. BACKGROUND

A variety of computerized devices have been developed to provide electronic information which may be useful with respect to global positioning data, tracking and identifying location of mobile objects, mapping of travel routes, or identification of local resources utilizing database(s) accessible from a single memory element or accessible from a combination of networked memory elements such as the Internet.

The global positioning system (GPS) uses a plurality of satellites to provide accurate measurements of three-dimensional position. A variety of conventional GPS devices have been developed to work with information generated by the GPS. With respect to certain conventional devices, an indicator corresponding to the location of an object ascertained by GPS can be superimposed upon a computer generated map or display to provide additional information to the user as disclosed by U.S. Pat. No. 5,471,392. Other types of conventional GPS devices allow the user to link certain information such as photographic images or geographic information to location coordinates as disclosed by U.S. Pat. Nos. 5,471,392; 6,282,362; or 5,506,644.

A variety of mobile object navigation devices have also been developed using the GPS to provide means to track and identify the location of mobile objects such as vehicles or communication devices such as cellular telephones. Many of these conventional devices match the location of a mobile object to locations of fixed roadways and object location may be indicated on road map data stored in a memory as described for example by U.S. Pat. Nos. 5,270,937; 5,270,937; 5,115,399; 5,189,430; 5,274,387; or 5,270,937; WIPO publications such as WO 01/94882; and other published patent specifications such as EP 1 118 837; or EP 0775891.

Certain mobile object navigation devices further provide route determination, route calculation, route planning, or route construction features such as those disclosed by U.S. Pat. Nos. 4,926,336; 5,168,452; 5,170,353; 5,041,983; 4,937,753; 4,984,168; 5,031,104; 4,962,458; 4,954,958; 5,172,321; 5,041,983; or 6,298,303. These route determination features may also provide optimized route determination that further accounts for weather or road condition in determining route as disclosed by U.S. Pat. No. 4,926,336. Additional features have been added to certain route determination devices which provide the user with information concerning adherence to determined route as disclosed by U.S. Pat. No. 5,523,765; adherence to time schedule in implementing the determined route as disclosed by U.S. Pat. No. 5,541,845; or the relationship of the mobile object to landmark data as disclosed by U.S. Pat. No. 5,067,081 or to a plurality of selected location coordinates as disclosed by EP 0 775 891.

As conventional mobile object navigation technology advanced additional features have been incorporated to display additional information keyed to coordinate locations in the displayed map as disclosed by EP 0 845 124. The additional information may also be displayed in relation to the location of the moving object providing blown up portions of the displayed map as disclosed by EP 1 024 347; photographic information as disclosed by U.S. Pat. No. 6,199,014; road information as disclosed by U.S. Pat. No. 5,293,163; hidden features as disclosed by EP 0 802 516; perspective maps as disclosed by EP 0 841 537; rally maps as disclosed by U.S. Pat. No. 6,148,090; or other information concerning places along the route as disclosed by U.S. Pat. No. 6,282,489. As to some mobile navigation technology a preview travelogue customized to the determined route can be displayed as disclosed by U.S. Pat. No. 5,559,707; or United States application 2002/0038180.

Similarly, with respect to identifying local resources within computer generated maps, an area is superimposed with or overlaid with information corresponding to the location on the map providing details of hotels, restaurants, shops, or the like, as disclosed by WIPO publication WO 97/07467; or U.S. Pat. No. 6,263,343.

Web-based map navigation may further involve the user activating icons on a map image to request information concerning a location or point of interest. Internet based map navigation involves transmitting a request to a server computer via a click event of an icon on a visual display unit showing a map image. The user's intent can be to learn more about a particular point of interest. This request causes the server computer to transmit information in the form of text or numeric data, real time video images, audio files, PDF documents or in some cases still photographs. These multimedia documents are then displayed in the then current window or are displayed in a separate window on screen. After review of this information, the user would return attention to the map image on-screen to seek further information at that location or to explore another location. The geo-referenced map image can be used as the means of navigating the map space and as the method of organizing geographically related information.

For example, interactive map sites on the World Wide Web may allow the user to view maps from many locations around the world. The user may be allowed to manipulate the geographic extent of the map (for example zoom in, zoom out) or change the content of the map (for example determine what geographic information should be displayed such as roads, political boundaries, land cover, or the like) or navigate to adjacent frames located in closest proximity as described by WIPO publication WO 01/44914.

In certain internet sites a still image may have associated interactive program content for displaying further selections such as images, ordering information, or purchasing products as disclosed by WIPO publication WO 98/00976. In some instances a plurality of sub-regions which contain a plurality of pixels allow selection of a location within the image corresponding to one of the plurality of sub-regions by the user which creates a link to a corresponding embedded image as disclosed by U.S. Pat. No. 6,356,283.

While there are a variety of navigation devices available for use with mobile objects such as vehicles or cellular telephones and a variety of resource identification systems available (whether for stand alone computers or for networked computer systems), and while there is a vast commercial market for such devices, significant problems with navigation and resource identification technology remain unresolved.

A significant problem with conventional navigation devices may be that the location coordinates used to references features within a displayed image (whether displayed in three dimensions, two dimensions, or one dimension) such as a planar map do not operate in the additionally displayed information or image(s).

One aspect of this problem may be that any further information, image(s) or other view(s) must be obtained by redirecting the user back to the displayed image having embedded location coordinates to select other location coordinates or to generate additional image(s).

A second aspect of this problem may be that selection of other location coordinates has to be made without the aid of the additionally displayed information or images, or without a spatial reference system within the additionally displayed information or images. As such, if location coordinates are, for example, selected within a planar map view (looking down on the map image from an overhead vantage point) the user does not have the advantage of utilizing any other views to make navigation decisions.

Another aspect of this problem may be that the additional images or information displayed are not referenced from the same origin coordinate location. User selection of location coordinates within an image may yield a plurality of additional images each of which may represent views or other information recorded from a plurality of different origin coordinate locations. As such, the user may not be able to understand the relationship of the views to one another.

Similarly, an aspect of this problem may be that the additional images or information displayed are not spatially referenced from the selected origin coordinate location. This aspect of the problem also relates to additional images or information spatially referenced to the respective origin coordinate location using different scales. When additional images are not spatially referenced from the selected origin coordinate location direction and magnitude of vectors may not be capable of assessment or may be inaccurately assessed by the user. As such, images or information not spatially referenced from the selected coordinate location or referenced from a different coordinate location then selected can have little or no value as a navigational guide to the user.

Another aspect of this problem may be that a plurality of different locations may be referenced within or by the additional displayed image(s) or information generated upon selection of a single coordinate location (for example, locations referenced within a single image may correspond to the horizon or objects in the foreground). However, there may not be a positionable indicator in the additional images to identify the location coordinates of the various locations referenced within the image or information.

Moreover, if positionable indicators are provided within generated images or information the coordinate location indicator within the initial image may remain spatially fixed even when the positionable indicator within the additional displayed images or other information is aligned with features having different coordinate location(s).

Another aspect of this problem may be that selection of location coordinates does not allow directional bias of the additional images displayed. Typically, selection of location coordinates retrieves all the images linked to that coordinate location. No means are typically provided to select only those images having a particular vector of a selected direction or magnitude from the origin.

Still another aspect of this problem may be that a three dimensional space may be displayed as a planar representation having an X-axis and a Y-axis and additional image(s) retrieved through selection of location coordinates are displayed as a planar representation having an X-axis and a Z-axis. As such, the Y-axis within the additionally retrieved images must be generated to identify the coordinate location within the additional image on the planar representation of three dimensional space. Conversely, the Z-axis within the planar computed space must be generated to identify the location on the computed planar space to the three dimensions imputed to the additional image.

Yet a further aspect of this problem may be that the user cannot navigate from a coordinate location in a first retrieved image to a coordinate location within a second retrieved image. Navigation requires that visual information referencing destination coordinate locations within generated image(s) be spatially referenced from the selected starting location coordinates allowing the user to predetermine magnitude and direction of travel. Similarly, upon arrival at a destination coordinate location additionally retrieved images must be spatially referenced to the destination coordinates to provide visual information which conveys additional destination coordinate locations to the user to select from.

Typically, selection of location coordinates in an initial image may provide serial presentation (whether timed serial presentation or user timed serial presentation) in a predetermined order. As such, the user may be provided with a slide show of images or information related to the selected location coordinates which may be drilled down through in linear fashion.

As discussed above, displayed images or visual information generated in response to selection of location coordinates may not be spatially referenced from that selected coordinate location. As such, the user may not be able to assess what coordinate location travel starts from. Similarly, when portions of the displayed images or visual information are selectable to retrieve further images or information the user cannot or does not navigate from image to image because the images do not provide destination coordinate locations for the selectable portions of the images or visual information or does not provide an indicator within a separately spatially referenced image to indicate the coordinate location of the portion of the image or information selected. As such, the user cannot determine destination coordinate location in advance of generating images or visual information related to that portion of the image or visual information. Again, images or visual information generated at arriving to the destination coordinate location may not be spatially referenced to the destination location coordinates.

The present invention addresses each of these problems with respect to navigating computer generated space and offers a solution to conventional travel and tourism websites such as Expedia, Orbitz and others which offer the means of making travel and tourism purchases of flights, hotel accommodations, automobile rental, restaurant reservations, or the like, which only provide linear drill down within the visual information or images for travel investigation. The invention can also be applied to the fields such as real estate, education and medicine, where linking images to a computed navigation space would provide advantages for image information display and retrieval.

III. DISCLOSURE OF THE INVENTION

Accordingly, a broad object of the invention can be to provide a first image of a computed navigation space (whether three dimensional, two dimensional, or one dimensional) having selectable location coordinates which allow access to at least one database to generate information (a portion of digitally recordable characteristics of a space obtained from a geographic location for example audio characteristics, spectral characteristics, energy characteristic, visual characteristics, geographic characteristics, or the like) spatially referenced to the computed navigation space from the selected location coordinates (selected coordinate location in the computed navigation space provides the origin for vectors having direction and magnitude in the accessed information) for display as a second image.

The computed navigation space can comprise any manner of space constructed by computer regardless of the number of dimensions, geometric properties, manner of symmetry, whether finite or infinite, having any location within identifiable by the indexing of two or more location coordinates (which may refer to column or row information). These coordinates can relate to Earth surface coordinate systems or those of other planets, or portions thereof. The computed navigation space can be any manner of computed space including without limitation a computed tomography (three dimensional image of body structure), a computed geography (geographical features of an area), a computed universe, a computed city, a computed landscape, a computed surface, a computed structure, or the like. The computed navigation space having selectable location coordinates is displayed as an image or representation in a first visual field (computer generated field, frame, window, or the like).

A user can make navigational decisions based upon the generated information which is spatially referenced to the location coordinates within the computed navigation space from the user's selected coordinate location (the selected coordinate location in the first visual field provides the origin in the second visual field from which vectors to selectable location coordinates within the accessed information derive direction and magnitude) and displayed in a second visual field (second computer generated field, frame, window, or the like).

Another broad object of the invention can be to provide navigation indicators positionably controllable within the first visual field and the second visual field. One aspect of this broad object of the invention can be to positionably couple a first navigational indicator in the first visual field to a second navigational indicator in the second visual field. As such, the first navigation indicator tracks location coordinates in the first visual field as the user positions the second navigation indicator within images displayed in the second visual field. As such, the user can determine location of each coordinate location in the image(s) displayed in the second visual field. Alternately, a separate location indicator in the first visual field can be positionably coupled to the second navigation indicator in the second visual field.

Another broad object of the invention can be to provide navigation within the computed navigation space through the images displayed in the second visual field to obviate the necessity of having to return the user to the image displayed in the first visual field to select alternate coordinate locations. As discussed above, one aspect of this object is to generate visual information in the second visual field spatially referenced to selectable location coordinates within computed navigation space from the selected coordinate locations within the computed navigation space. A second aspect of this object of the invention is to allow the user to select locations in the visual information displayed in the second visual field to generate additional images spatially referenced to the location coordinates in the computed navigation space corresponding to the selected location in the visual information.

Another broad object of the invention can be to directional bias the generation of visual information displayed in the second visual field. One aspect of this broad object of the invention can be to generate a directional vector from the selected coordinate location in the first visual field to directionally gate generation of visual information displayed in the second visual field. A second aspect of this broad object of the invention can be to increment direction of the displayed image in the second visual field to expose within the second visual field additional visual information. Another aspect of this broad object of the invention can be to directionally bias or gate the generation of visual information displayed after navigating to a location within a displayed image.

Another broad object of the invention can be to provide a computed geographic space represented within the first visual field as a geo-planar map having selectable location coordinates which access geographic image(s) spatially referenced to selectable location coordinates in the computed geographic space from the user's selected coordinate location on the geo-planar map which are displayed in the second visual field. A user can position the navigation indicator at a desired destination location in the geographic image displayed and ascertain the coordinate locations in the geo-planar view and travel to that desired destination location Naturally, further objects of the invention are disclosed in by the Figures, Description of the Invention, and Claims.

IV. BRIEF DESCRIPTION OF THE DRAWINGS

FIG. 2 illustrates an embodiment of a data structure for a location coordinates match element.

FIG. 6 illustrates an embodiment of a data structure for a location coordinates match element.

Figure 7:
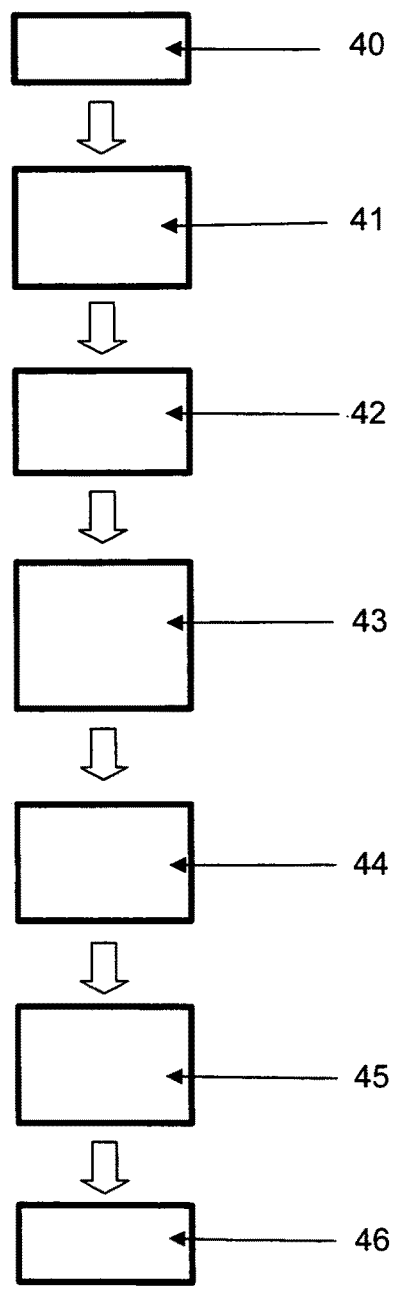

FIG. 7 provides a flow diagram for use of an embodiment of the invention.

Figure 8:
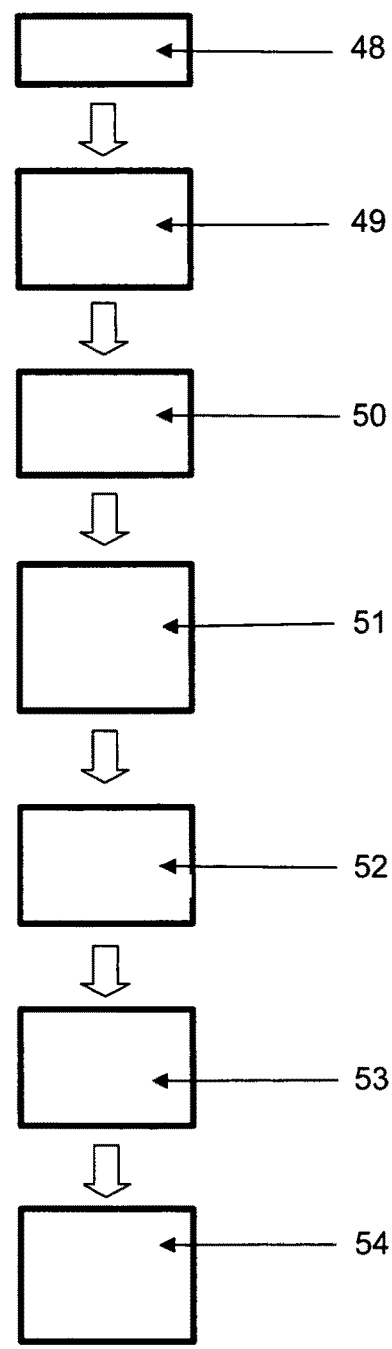

FIG. 8 provides a flow diagram for use of an embodiment of the invention.

Figure 9:
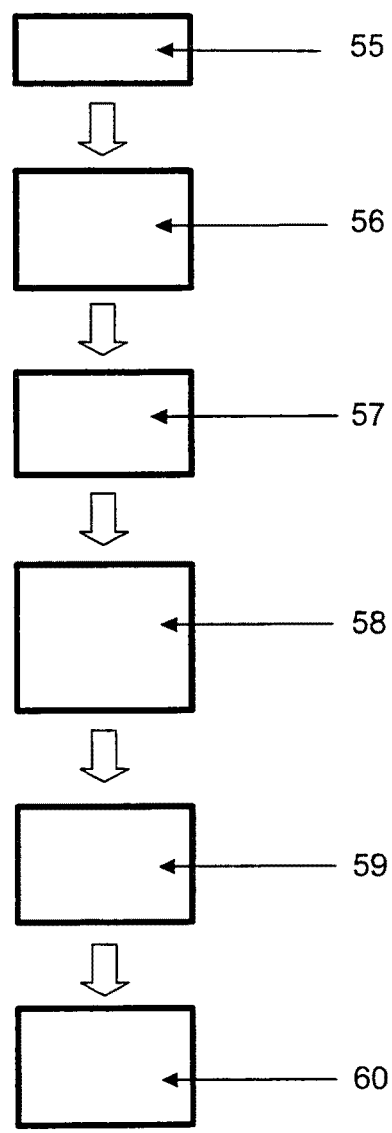

FIG. 9 provides a flow diagram for use of an embodiment of the invention.

Figure 10:
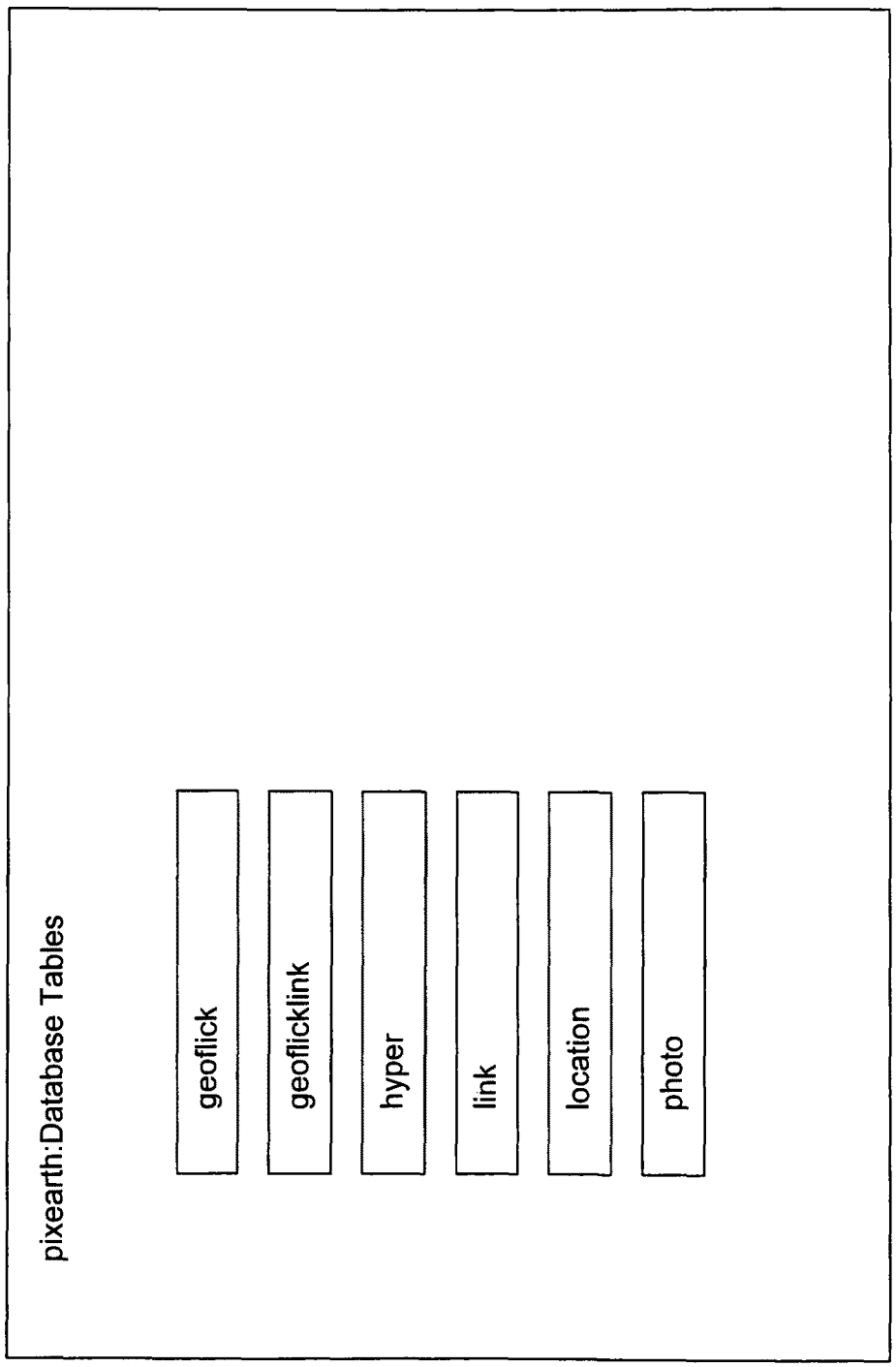

FIG. 10 shows an embodiment of the invention having a database that can be implemented using related tables in a relational database system (RDBMS).

FIG. 11 shows an embodiment of the invention having a table which establishes the location of information hyperlinks on geographic movie images.

FIG. 12 shows an embodiment of the invention having a table which establishes the location of information hyperlinks on geographic movie images.

FIG. 13 shows an embodiment of the invention having a table which stores photographic data necessary to support the geographic movie images as a client application.

FIG. 14 shows an embodiment of the invention having a table which stores photographic data necessary to support the geographic movie images as a client application.

FIG. 15 shows an embodiment of the invention having a table which establishes the location of information hyperlinks on the geographic images spatially referenced to the computed navigation space.

FIG. 16 shows an embodiment of the invention having a table which establishes the location of information hyperlinks on the geographic images spatially referenced to the computed navigation space.

FIG. 17 shows an embodiment of the invention having a table which establishes the location coordinates and content of hyper-navigation links on the geographic images.

FIG. 18 shows an embodiment of the invention having a table which establishes the location coordinates and content of hyper-navigation links on the geographic images.

FIG. 19 shows an embodiment of the invention having a table which records the geographic coordinates of each photographic location allowing coordinate locations within geographic images to be displayed on a geo-planar representation of the computed navigation space.

FIG. 20 shows an embodiment of the invention having a table which records the origin geographic location coordinates referenced to the geographic computed navigation space for each geographic image allowing geographic photographic image location coordinates to be displayed on the geo-planar representation of the computed navigation space.

FIG. 21 shows an embodiment of the invention having a table which associates multiple geographic photographic images with a single origin coordinate location referenced to selectable location coordinates within the computed navigation space.

FIG. 22 shows an embodiment of the invention having a table which associates multiple geographic photographic images with a single origin coordinate location referenced to selectable location coordinates within the computed navigation space.

Figure 23:
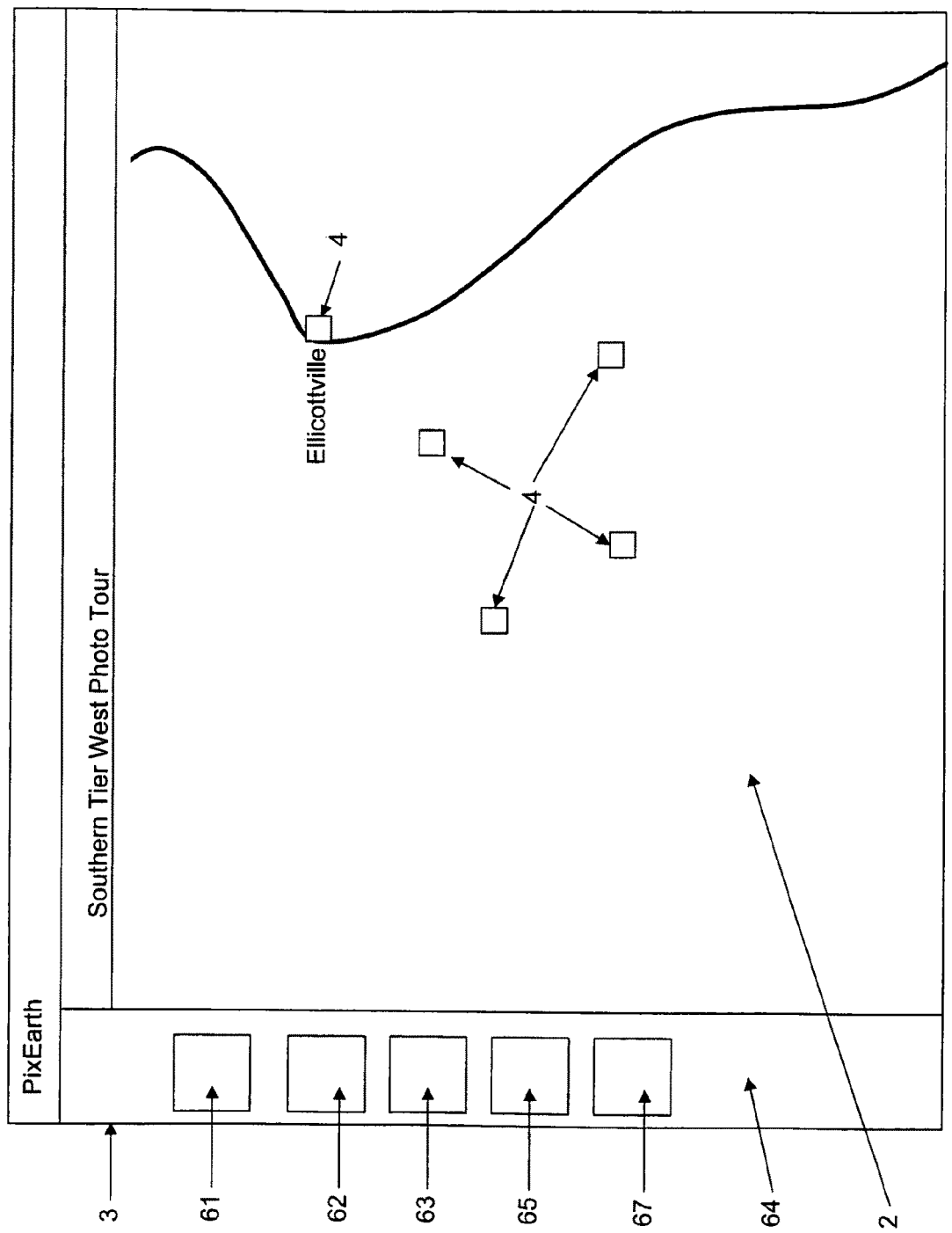

FIG. 23 shows an embodiment of the invention which provides a geo-planar representation (2) of the computed navigation space (1) within a first visual field (3).

Figure 24:
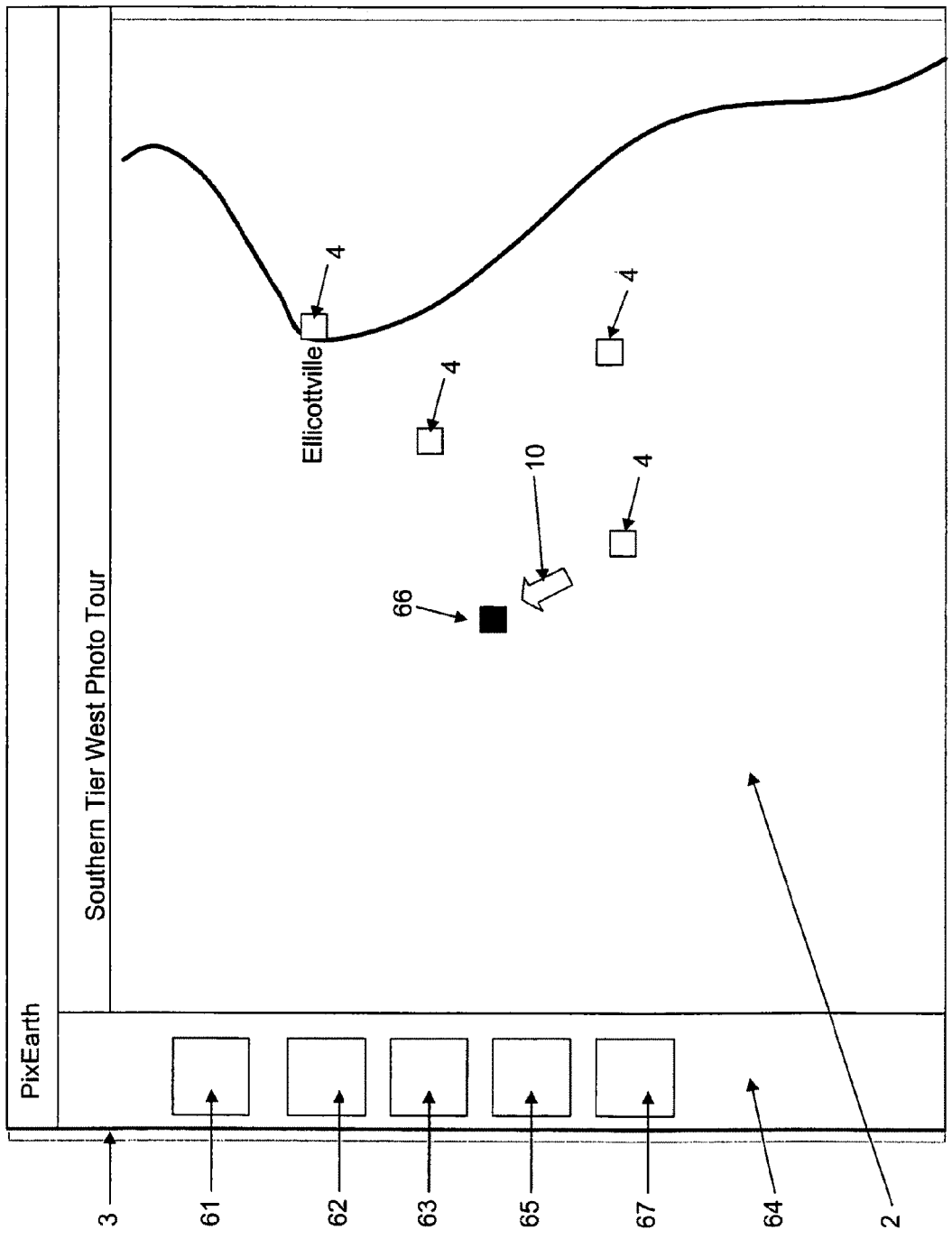

FIG. 24 shows an embodiment of the invention in which the geo-planar representation of the computed navigational space has a positionably controllable navigation indicator to select location coordinates.

Figure 25:
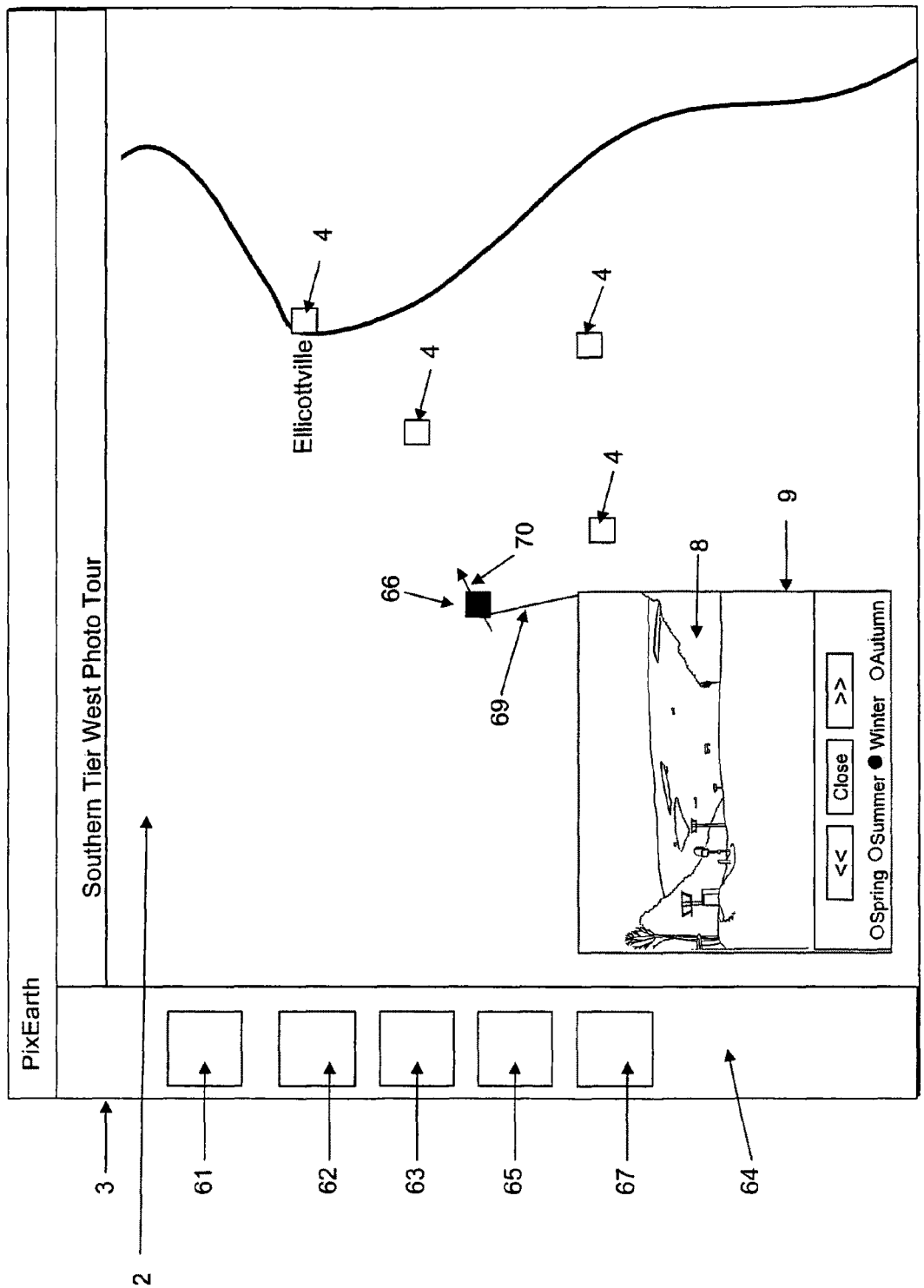

FIG. 25 shows an embodiment of the invention in which the result of clicking on the selectable location coordinates in the geo-planar representation retrieves visual information (geographic photographic image) spatially referenced to location coordinates of the computed navigation space (1) from the selected location coordinates and further providing a persistent leader line to the selected location coordinates within the geo-planar representation.

Figure 26:
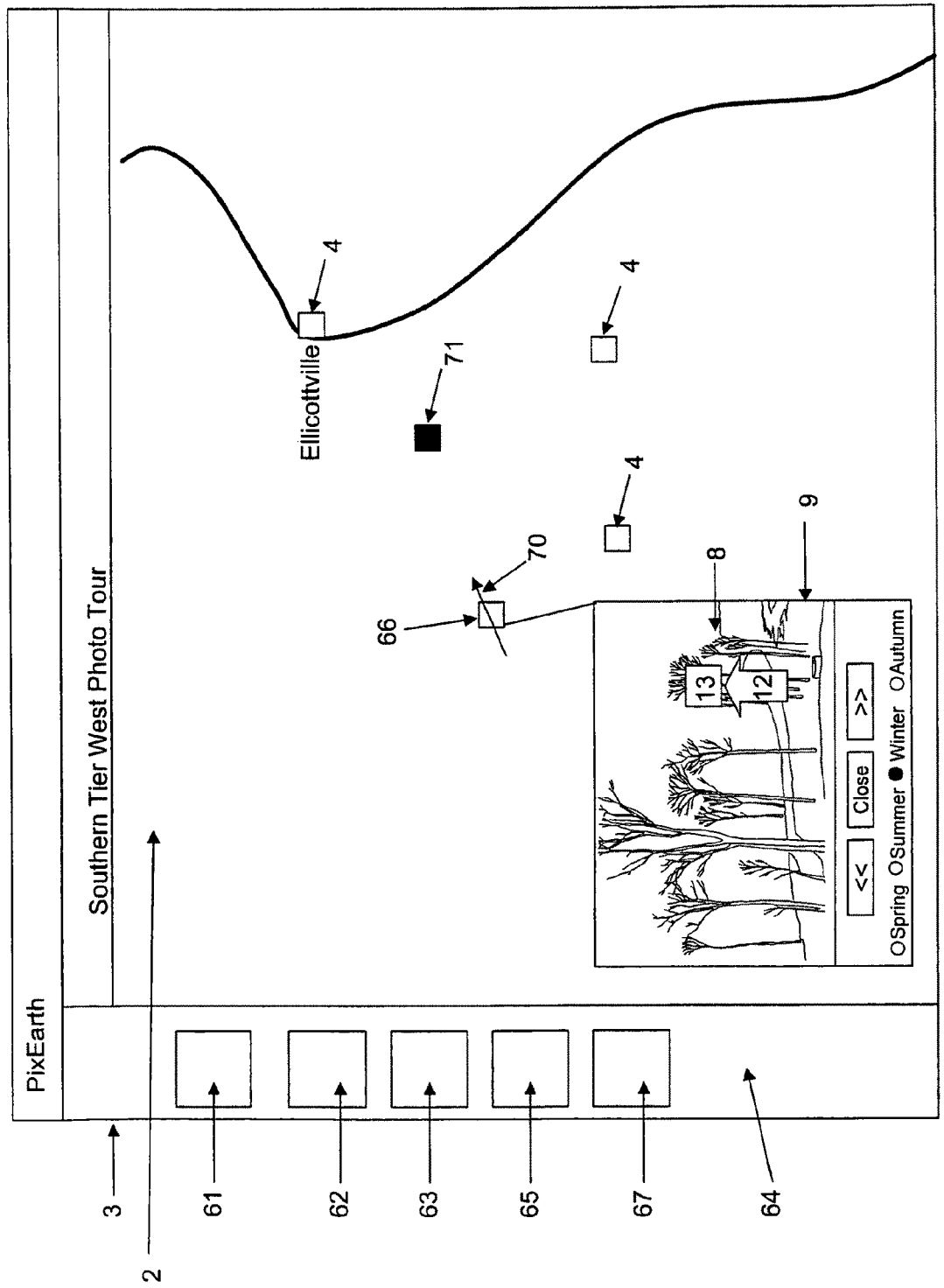

FIG. 26 shows an embodiment of the invention having a positionably controllable navigation indicator within the geographic visual information to select destination location coordinates and further including an indicator within the corresponding geo-planar representation that indicates destination location coordinates are enabled.

Figure 27:
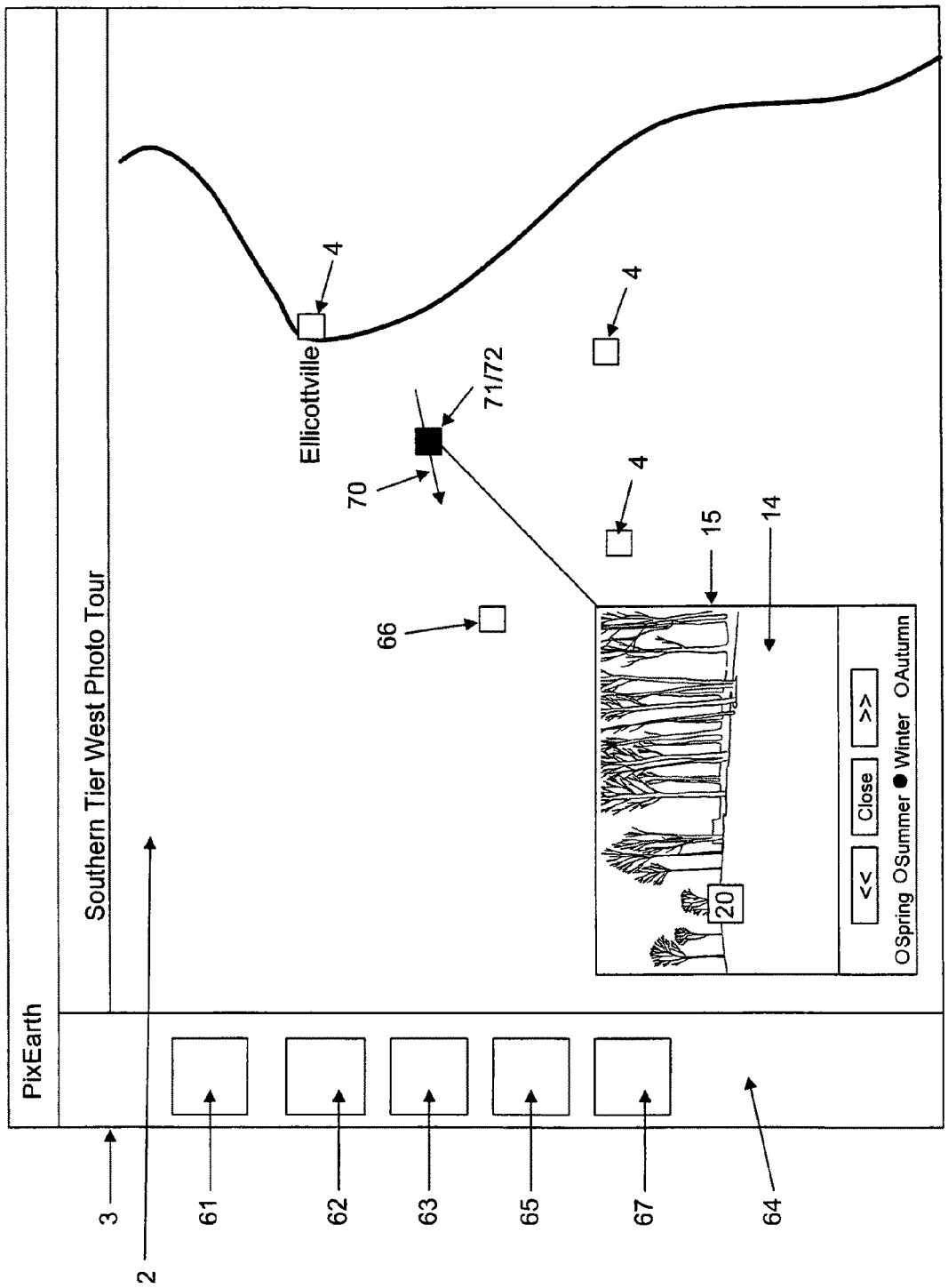

FIG. 27 shows an embodiment of the invention in which the result of clicking on the location coordinates within the geographic visual information causes the location indicator in the geo-planar representation to move to the destination location coordinates selected and destination geographic visual information is displayed.

Figure 28:
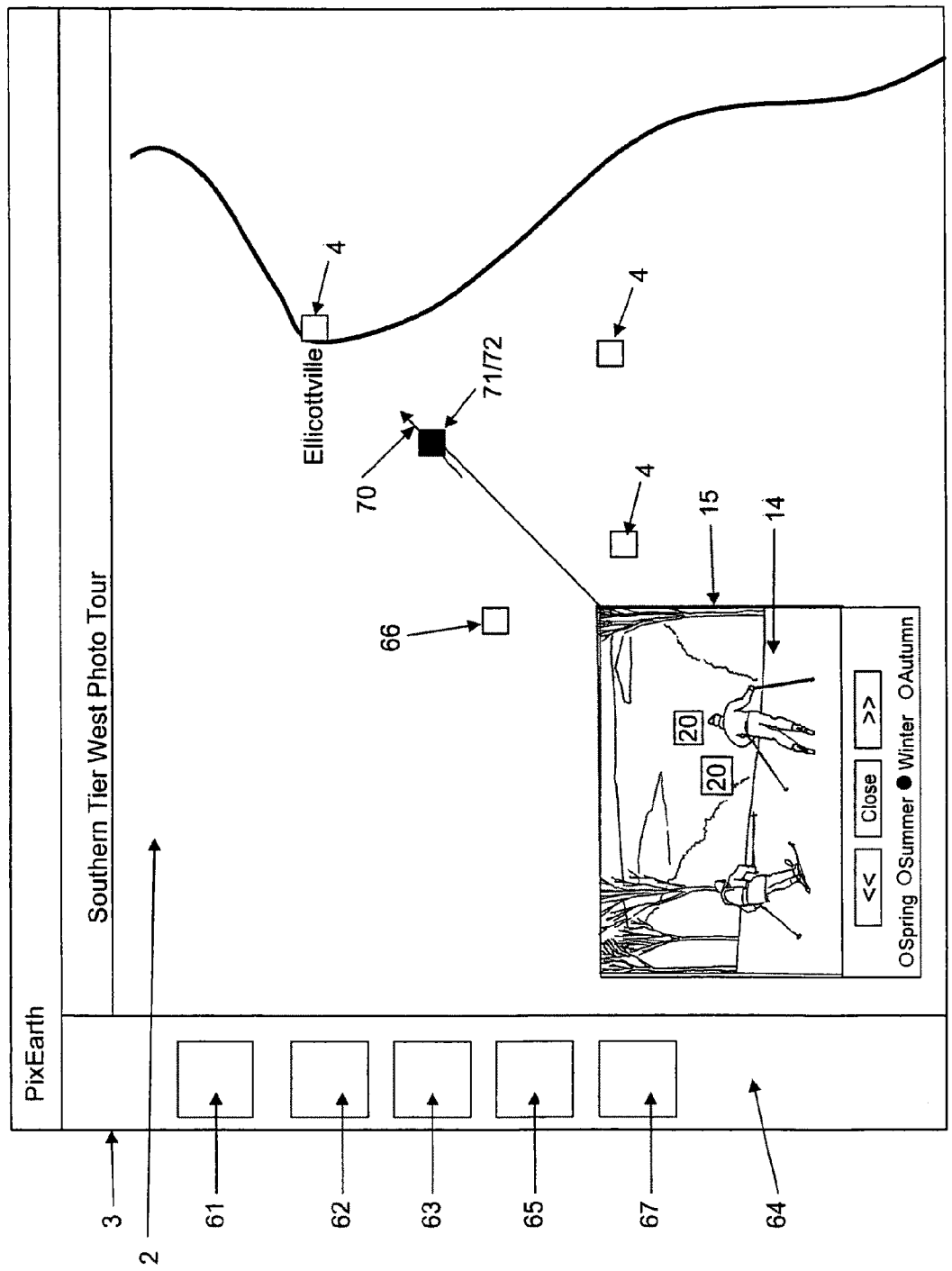

FIG. 28 shows an embodiment of the invention in which the destination geographic visual information displayed provides more than one hypernavigation icon visible for selection by the user.

Figure 29:
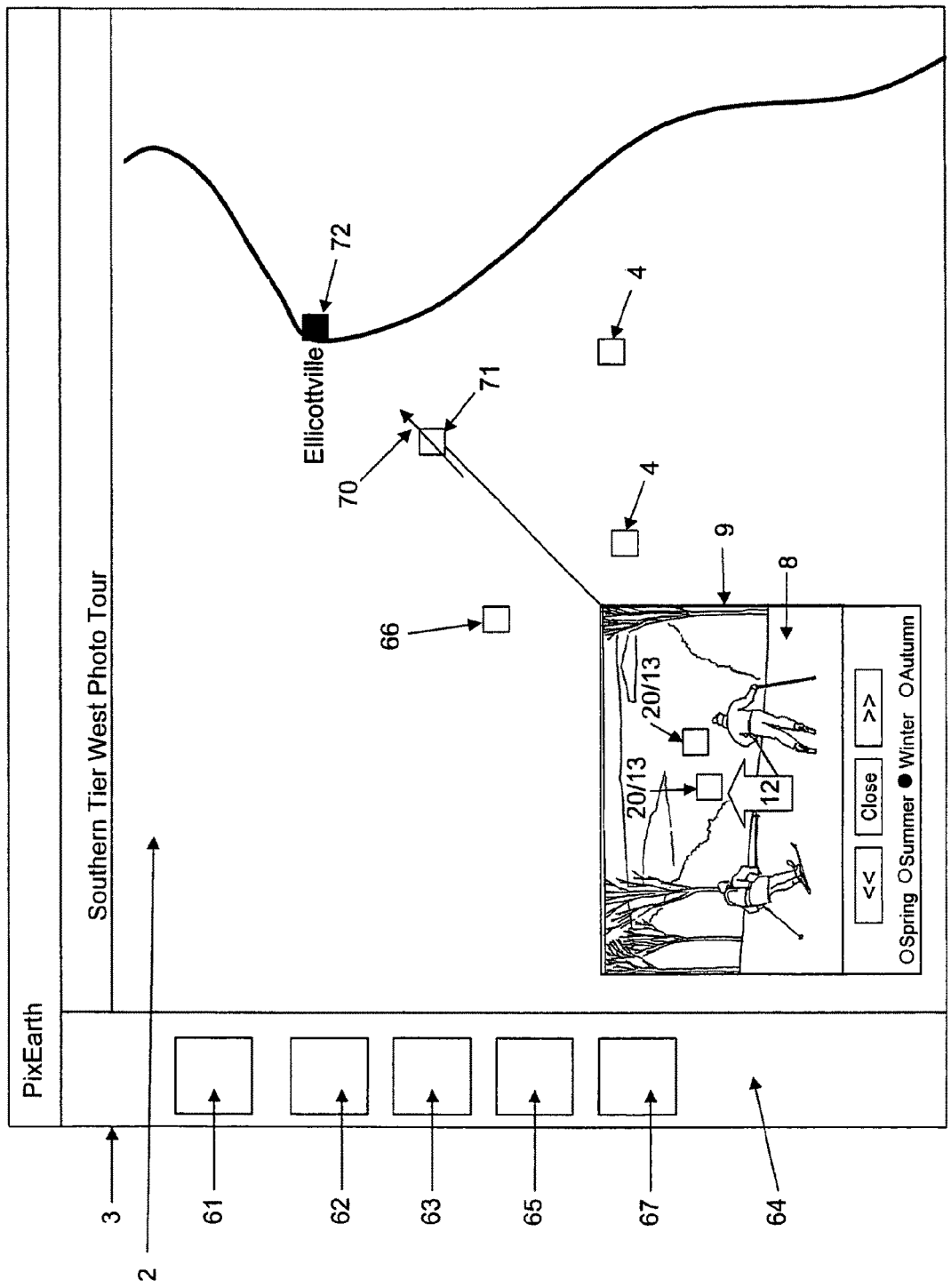

FIG. 29 shows an embodiment of the invention in which destination location coordinates within the geographic visual information are indicated that relate to features in the geographic visual information of a town.

Figure 30:
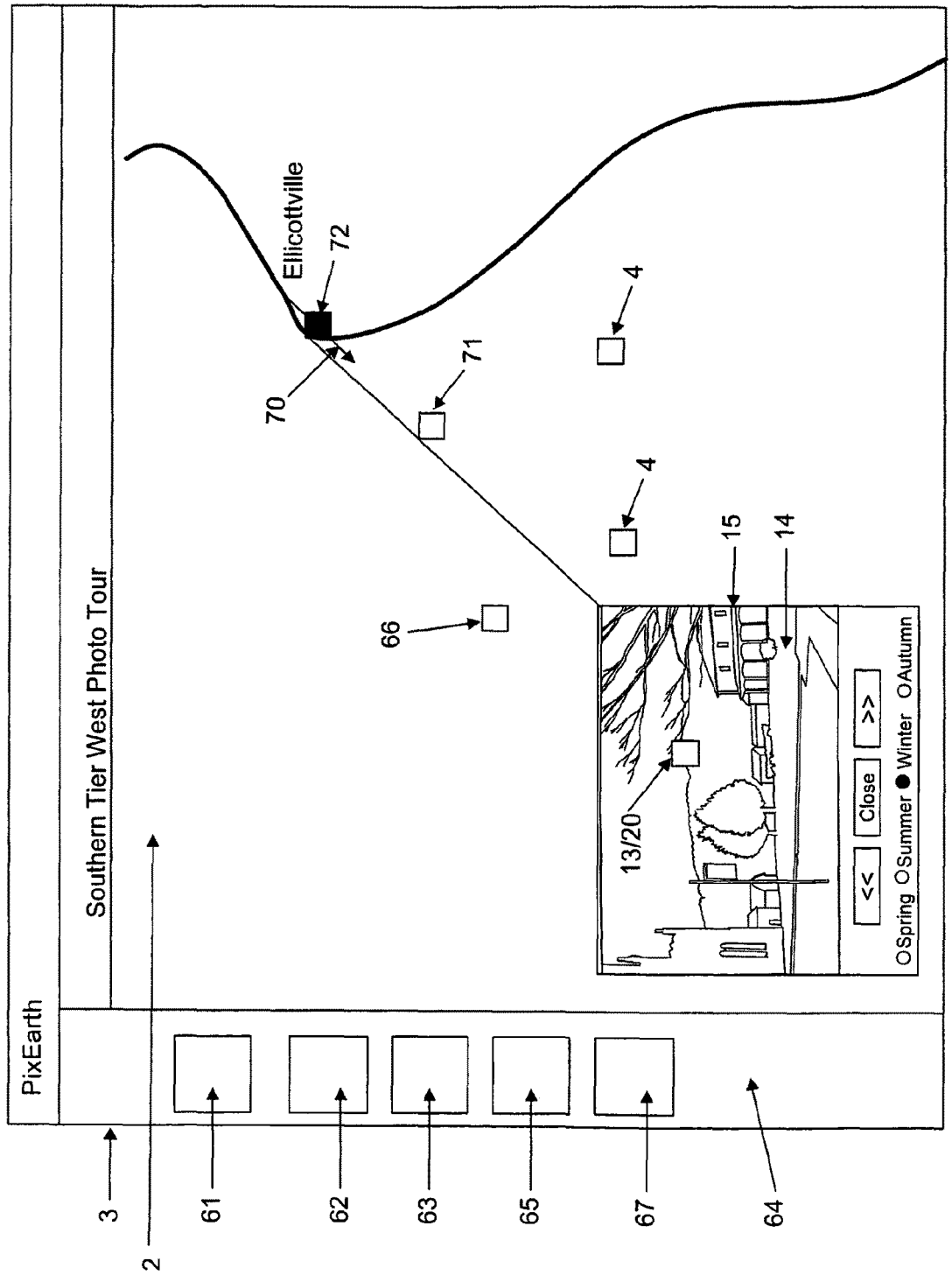

FIG. 30 shows an embodiment of the invention in which clicking the positionably controllable navigation indicator on destination location coordinates within the geographic visual information of the town retrieves destination geographic visual information which provides a view in the direction of the selected destination location coordinates.

Figure 31:
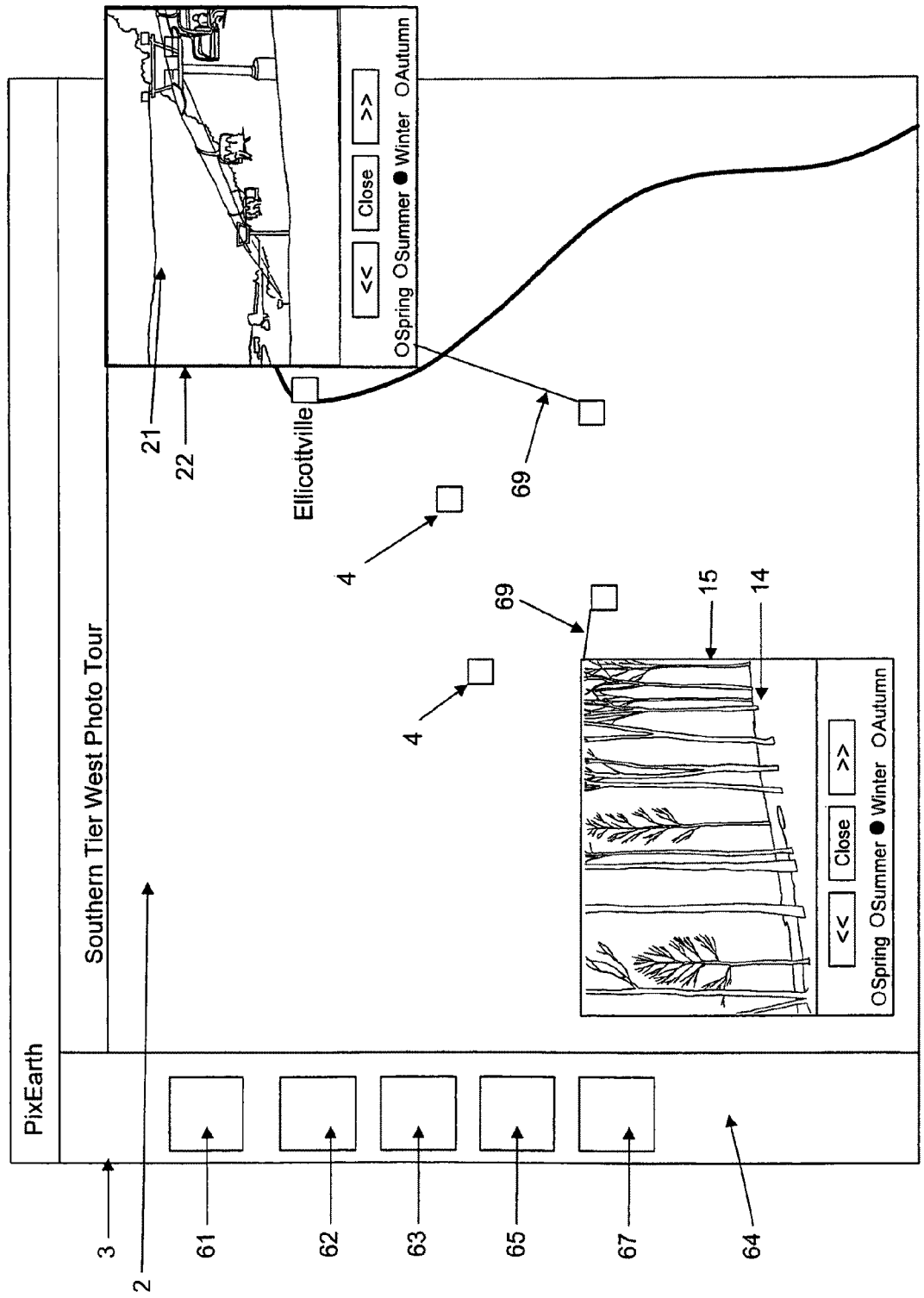

FIG. 31 shows an embodiment of the invention which allows multiple fields for geographic information to be displayed at the same time.

Figure 32:
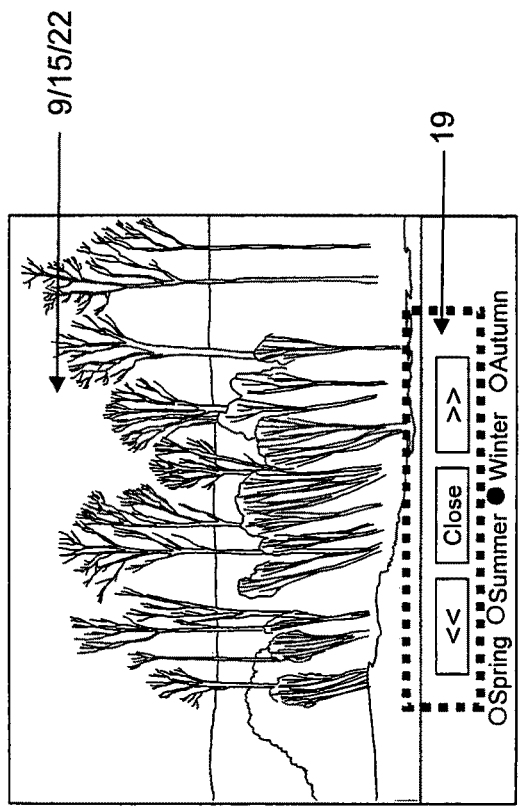

FIG. 32 shows an embodiment of the invention allows multiple fields for geographic information to be displayed from different azimuth directions around the same geographic origin location.

Figure 33:
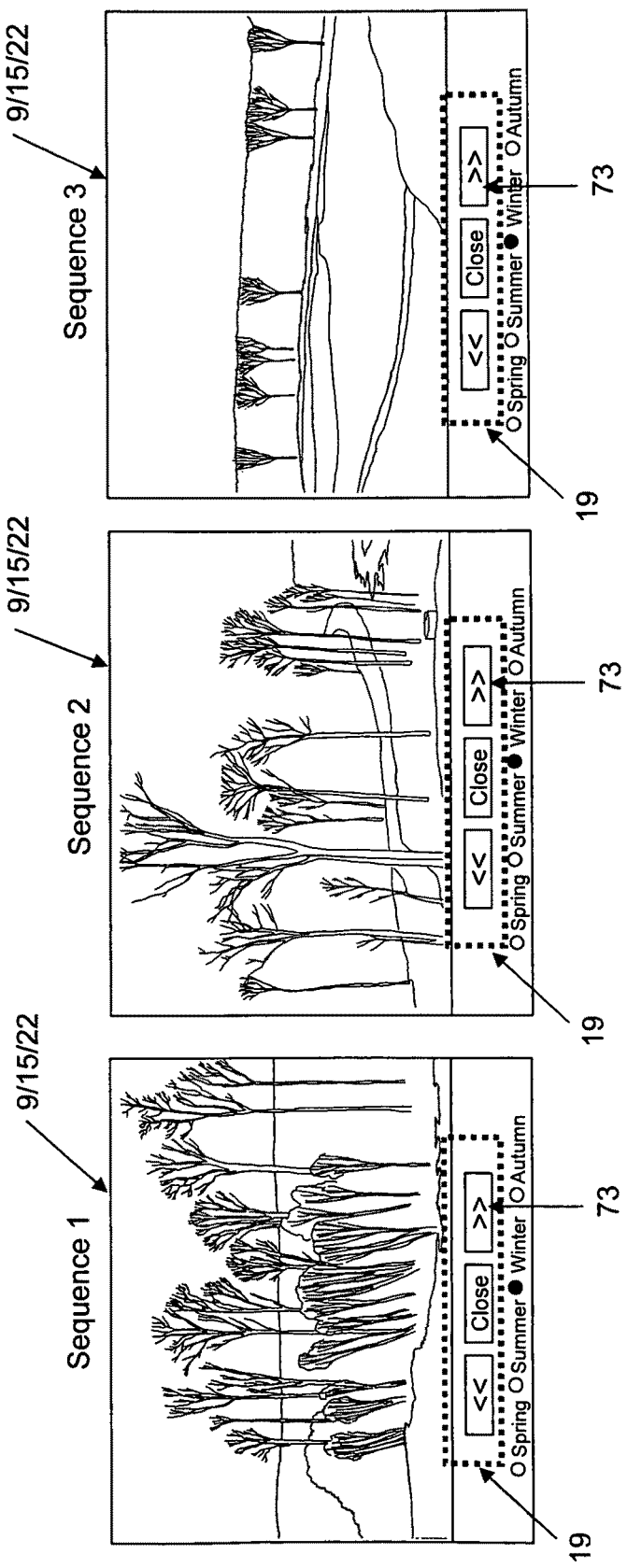

FIG. 33 shows an embodiment of the invention which allows incremental rotation in azimuth (view direction) about the geographic origin and further includes a directional indicator in the geo-planar representation which correspondingly indicates direction of view from the geographic origin of the geographic visual information.

Figure 34:
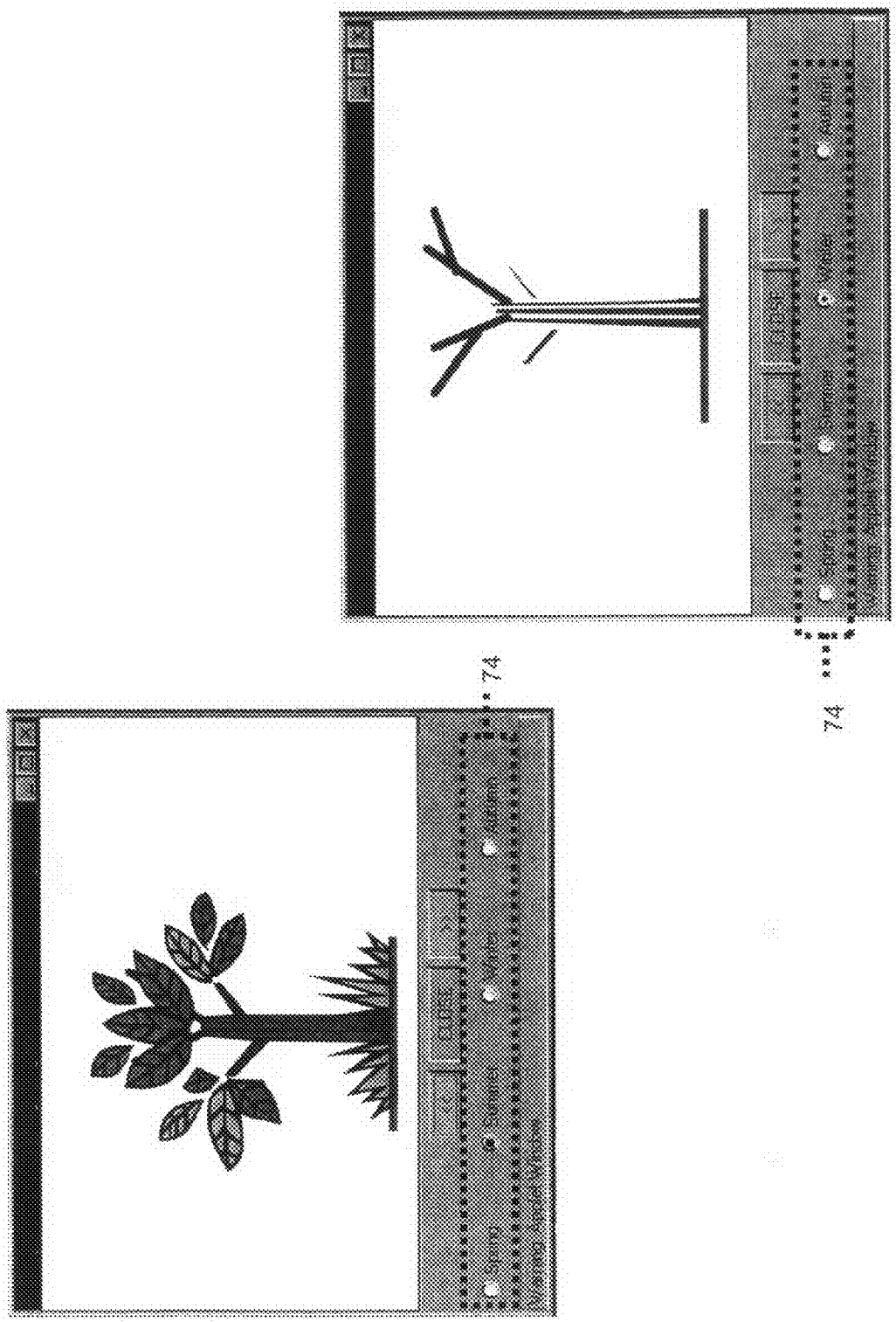

FIG. 34 shows an embodiment of the invention which allows a plurality of geographic visual information to be displayed from the same geographic origin but in different seasons of the year.

Figure 35:
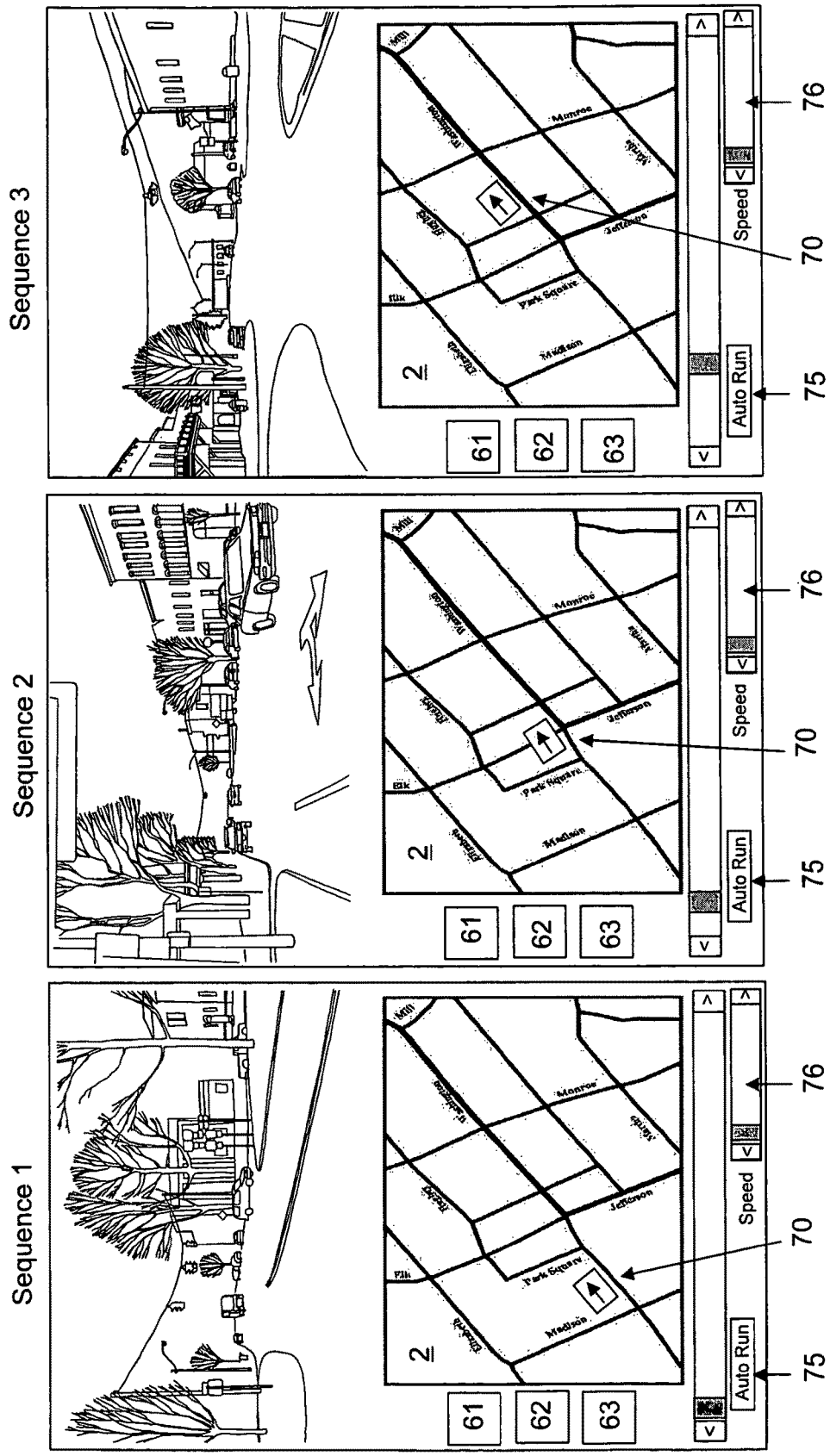

FIG. 35 shows an embodiment of the invention which provides an automatic operation feature to navigate the user geographically along a route.

Figure 36:
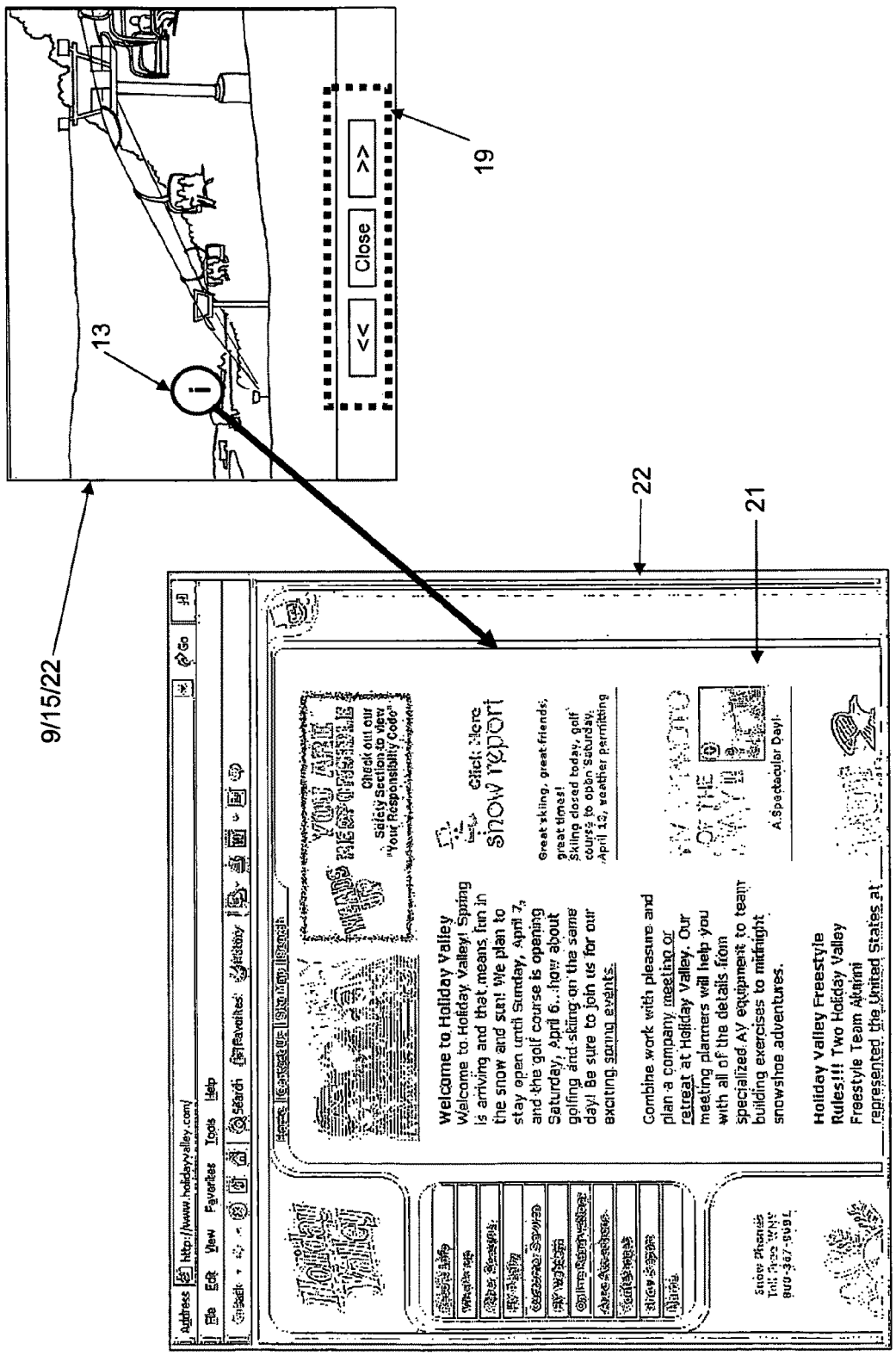

FIG. 36 shows an embodiment of the invention which can retrieve additional visual information such as documents corresponding to destination location coordinates within geographic visual information.

FIG. 37 shows an embodiment of the invention which shows how selection of destination location coordinates within geographic visual information allows navigation within a building or other type of structure.

V. MODE(S) FOR CARRYING OUT THE INVENTION

A plurality of images each spatially referenced to coordinate locations within a computed navigation space from a selectable origin coordinate location implement three dimensional navigation of the computed navigation space. A user can serially select destination coordinates within each of the plurality of images to experience three dimensional navigation within digitally recordable characteristics of a space including without limitations audio characteristics, spectral characteristics, energy characteristic, visual characteristics, geographic characteristics, anatomical structure, a city, a region, or the world, or the like.

Figure 1:
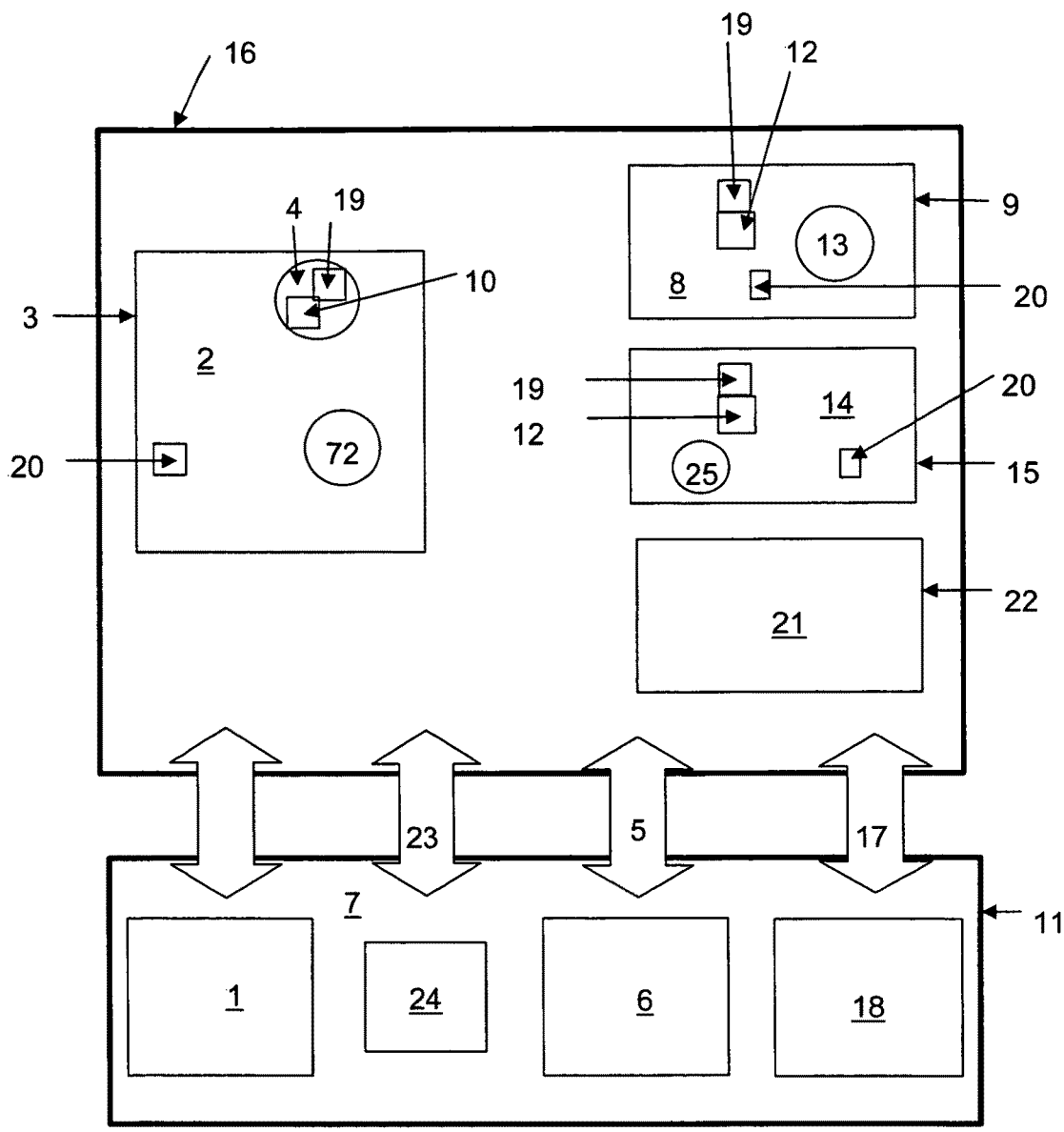
FIG. 1 is a schematic representation of a computer and internet system embodiment of the invention.

Now referring primarily to FIG. 1, a computer application provides a computed navigational space (1) generated as an representation (2) within a first visual field (3) having a plurality of selectable location coordinates (4) which allow access (5) to at least one database (6) stored within a memory element (7) to generate (6) visual information (8) spatially referenced to the computed navigation space (1) from the selected location coordinates (4) for display within a second visual field (9).

As discussed above the computed navigation space (1) can comprise any manner of space constructed by the computer application regardless of the number of dimensions, geometric properties, manner of symmetry, whether finite or infinite, having any location within such computed navigation space (1) identifiable by the indexing of two or more location coordinates (which may refer to column or row information) (4).

The following components can be used to implement the computed navigation space (1) described above. It is understood, that this list of components is not limiting with respect to the numerous and varied embodiments of the invention. Rather, it is intended that the components listed are illustrative of how to make and use the numerous and varied embodiments of the invention whether the embodiments involve without limitation a computed tomography of anatomical structure, computed geographic space, computed auditory space, computed spectral or energy space, or the like.

The computer application used to generate the computed navigational space (1) can be implemented in any commercially available relational database system (RDBMS) such as Oracle, Microsoft SQL Server, Microsoft Access, IBM DB2. For Internet applications, a web server can further act to implement a standard web server software, such as Microsoft IIS, Apache, and iPlanet. The system does not need to be implemented using an RDBMS. The implementation could be through any data structure (object database, text file, etc) capable of storing the required data and data relationships. Also, in some embodiments no pre-defined data structure may be required, and all relationships are auto-calculated based on coordinate relationships and photographic image parameters.

The computer application used to generate the representation (2) (whether a geo-planar map or otherwise) of the computed navigation space (1) identifies and implements without limitation standard map server applications such as ESRI ArcIMS, MapQuest, or Microsoft MapPoint.

Internet client applications of the invention can be implemented by a computer application such as "pixearth.client" and "pixearth.servlets" set out by U.S. Provisional Application No. 60/377,642 (including the specification, drawings and exhibits A through C), hereby incorporated by reference in their entirety herein. The "pixearth" applications queue and broker requests sent from client applications acting as the interface between the server (11) components and the clients requests which are passed through the web server to select images from the database (6) based on a representation (2) that is transmitted from the client such as HyperNav and also such as GeoFlick which essentially geo-references each frame that makes up a movie, so that the location (and direction of view) for each frame can be shown simultaneously on a map display.

While FIG. 1 shows only a single location coordinates (4) for illustrative purposes, a plurality of selectable location coordinates within the planar representation (2) of the computed navigation space (1) can define a coordinate location with the resolution of a single pixel, if desired. As such, every pixel within the representation (2) of the computed navigation space (1) can be assigned location coordinates (4). Alternately, the number of pixels defining a coordinate location can vary depending on factors such as the scale of the representation (2) the dimensions of the first visual field (3) the relative space of the coordinate location to the computed space, or the like.

A positionably controllable navigation indicator (10) within the planar representation (2) of the computed navigation space (1) within the first visual field (3) can be operably coupled to selected location coordinates (4) to access (5) a database (6).

The visual information (8) accessed (5) by selection of location coordinates (4) generated within the second visual field (9) can be any manner of recordable characteristics of any space which can be digitally stored and spatially referenced to the computed navigation space. As such, the visual information (8), can be a fractional representation of recordable characteristics of the space sensorially perceivable to the human eye, a fractional representation of recordable characteristics of the earth, a fractional representation of recordable characteristics of a city, a fractional representation of recordable characteristics of thoroughfares (roads, highways, paths, or the like), a fractional representation of recordable geography, a fractional representation of recordable geography sensorially perceivable to the human eye, and a fractional representation of anatomical structure.

In certain embodiments of the invention, the visual information (8) comprising recordable characteristics of the space can be one or more photographic image(s) recorded from a coordinate location represented within the computed navigation space. The photographic image recorded from the coordinate location can include locations, features, or aspects which can define vectors of any direction or magnitude. The photographic images can include without limitation geographic images of the Earth's surface, a city, a town, a building, or any portion thereof.

The second visual field (9) in which the visual information (8) is displayed can be separated from the first visual field (3) either by display on a separate display screen (16) or by separation of the images on the same display screen (16) or by overlaying the first visual field (3) with the second visual field (9).

A positionably controllable navigation indicator (12) within the second visual field (9) can be operably coupled to selectable location coordinates (13) within the visual information (8). While, FIG. 1 shows only a single one of the selectable location coordinates (13) within the visual information (8) for illustrative purposes, a plurality of selectable location coordinates (13) within the visual information (8) can define a coordinate location with the computed navigation space (1) with resolution of a single pixel, if desired. As such, every pixel within the visual information (8) can be assigned selectable location coordinates (13).

Because the visual information (8) is spatially referenced to location coordinates within the computed navigation space (1), positioning of the positionably controllable navigation indicator (12) within the visual information (8) can alter position of the positionably controllable navigation indicator (10) within the computed navigation space (1) to the same coordinates. In certain embodiments of the invention, a separate location indicator (72) in the computed navigation space (1) is coordinately coupled to the positionably controllable navigation indicator (12) in the visual information (8). In these embodiments of the invention, the positionably controllable navigation indicator (10) can remain at the selected coordinates (4) which comprise the origin coordinate location for the visual information (8) while the separate location indicator (72) shows coordinate location within the computed navigation space (1) of the location coordinates that correspond to the positionably controllable navigation indicator (12) in the visual information (8). Importantly, this allows the user to understand the direction and magnitude of the vector from the origin coordinate location to the location coordinates that correspond to the positionably controllable navigation indicator (12) within the visual information (8).

Upon selection of the location coordinates (13) within the visual information (8) operably coupled to the positionably controllable navigation indicator (12), that portion of the database (6) related to the location coordinates (13) selected can be accessed to generate destination visual information (which can be one or a plurality of images) spatially referenced from the selected location coordinates (13). The destination visual information (14) may be displayed in a third visual field (15) separate from the first visual field (3) or the second visual field (9) within the same display screen (16) or on different display screens. Alternately, the destination visual information (14) can replace or overlay the visual information (8) within the second visual field (9). In certain embodiments of the invention the location indicator (20) or the positionably controllable navigation indicator (10), or both, within the computed navigation space (1) can locate to the origin coordinate location from which the destination visual information (14) is spatially referenced. Self-guided navigation of the computed navigation space (1) can be implemented by serial selection of location coordinates (13) (25) first within the visual information (8) and then in generated destination visual information (14).

Certain embodiments of the invention may provide a directional bias element (19) either separately or responsive to one or both of the positionably controllable navigation indicators (10)(12). The directional bias element (19) can in the first instance be used to gate retrieval of visual information (8) from the database to selected directional vector(s) from the location coordinates (4) in the representation (2) of the computed navigation space (1). In the second instance the directional bias element can be used to alter the directional bias of the gate to retrieve additional visual information (8) spatially referenced to the selected location coordinates (4). In the third instance, the directional bias element (19) can be used to gate retrieval of destination visual information (14).

Location coordinates (4)(13)(25) within the computed navigation space (1) or in the visual information (8) or destination visual information (14) can further be used to access (17) at least one addition database (18) within the same computer or in a network (such as an office network or the Internet) stored within a single or a plurality of memory elements (7). Data representations or data presentations (21) retrieved from such additional databases (18) can be displayed in a fourth visual field (22) within the display (16), or displayed on a separate display screen or by overlaying the any or all of the first visual field (3), the second visual field (9), or the third visual field (15) with the fourth visual field (22).

Again referring primarily to FIG. 1, spatial referencing of visual information (8) or destination visual information (14) to location coordinates within the computed navigation space (1) from selectable location coordinates (4) within the representation (2) of the computed navigation space (1) can be provided in some embodiments of the invention by access (23) to a location coordinates match element (24).

Now referring primarily to FIGS. 2 to 6, examples of location coordinates match elements (24) that can be used to implement various embodiments of the invention are shown. It is understood that these specific examples are not meant to be limiting with respect to implementing the various embodiments of the invention described, but rather are illustrative of the numerous and wide variety of location coordinate match elements (24) that can or could be used to implement certain basic functionalities of the invention. Embodiments of the location coordinates match element (24) provide a data structure (for example, a table providing columns and rows) which relate location coordinates in the visual information (8) or location coordinates in the destination visual information (14) to location coordinates in the computed navigation space (1).

Now referring primarily to FIG. 2, an embodiment of the location coordinates match element (24) matches coordinates in two-dimensional visual information (8) to three dimension space in the computed navigation space (1), and vice versa. The visual information X coordinates (25) and the visual information Y coordinates (26) corresponding to the visual information (8) are entered into a data structure (30), which can be a table as shown in FIG. 2. A computed navigation space X coordinate (27), a computed navigations space Y coordinate (28), and a computed navigation space Z coordinate (29) are assigned to each visual information coordinate location (visual information X, visual information Y) in the data structure (30).

A coordinate location (13) within the visual information (8) is selected by the user and the computer application locates the matching or the closest to matching visual information X coordinate (25) and the visual information Y coordinate (26) in the data structure (30). The corresponding computed navigation space X, Y, Z (27)(28)(29) can then be utilized to identify location of the selected visual information coordinate location within a separate representation (2) of the computed navigation space.

Figure 3:
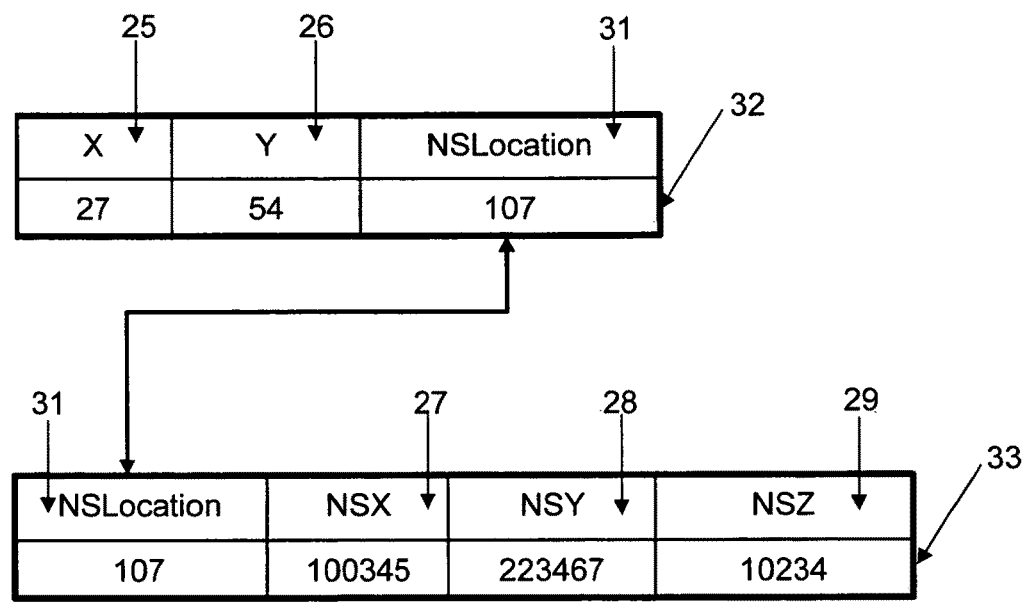
FIG. 3 illustrates an embodiment of a data structure for a location coordinates match element.

Now referring primarily to FIG. 3, an embodiment of the location coordinates match element (24) matches a visual information X coordinate (25) and a visual information Y coordinate (26) to a computed navigation space location (31) in a first data structure (32). In a second step, the computed navigation space location (31) can then be matched to corresponding computed navigation coordinates (27)(28)(29) within a second data structure (33).

The visual information X coordinates (25) and the visual information Y coordinates (26) corresponding to the visual information (8) are entered into the first data structure (32). A corresponding computed navigation space location (31) is assigned to each visual information coordinate location (visual information X, visual information Y) in the data structure (32). The assigned computed navigation space locations (31) are further entered into the second data structure (33) along with the corresponding computed navigation coordinates (27)(28)(29).

This embodiment of the location coordinates match element (24) could be utilized by determining a location within the visual information (8) (for example, by positioning a cursor at the location). The computer application determines the pixel coordinates of the coordinate location within the visual information (8). These pixel coordinates are utilized with a computer application to locate the matching, or the closest to matching, visual information X-coordinate (25) and visual information Y-coordinate (26). The matching (or in certain embodiments closest match) navigation space location (31) is then used to match the computed navigation coordinates (27)(28)(29).

Figure 4:
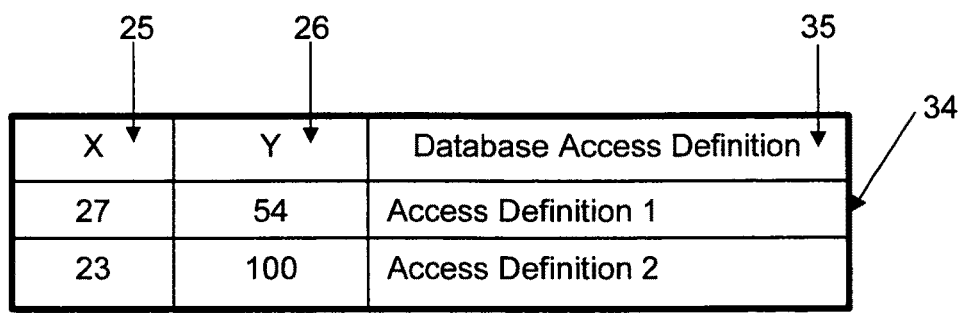
FIG. 4 illustrates an embodiment of a data structure for a location coordinates match element.

Now referring primarily to FIG. 4, with respect to another embodiment of the location coordinates match element (24), a data structure (34) provides a table in which visual information X and Y coordinates (25)(26) are entered along with corresponding database access definitions (35) (such as an Internet URL).

This embodiment of the location coordinates match element (24) could be utilized by selecting a location within the visual information (8) or destination visual information (14) (for example, position the navigation indicator (12) to that location in the visual information (8) to which a computer application utilizes pixel coordinates to locate the matching, or the closest to matching, visual information X-coordinate (25) and visual information Y-coordinate (26). The corresponding visual information X and Y coordinates (25)(26) which are then matched to the database access definition (34). Information related to the selected visual information coordinate location can then be presented.

Figure 5:
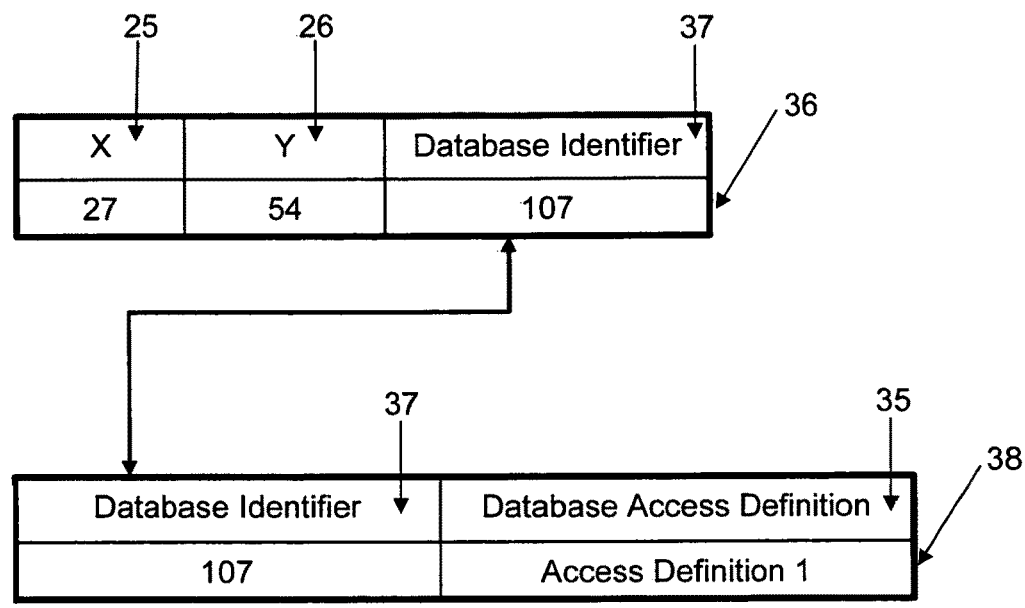
FIG. 5 illustrates an embodiment of a data structure for a location coordinates match element.

Now referring primarily to FIG. 5, an embodiment of the location coordinates match element (24) provides a first data structure (36) and a second data structure (38). In the first data structure visual information X coordinates (25) and the visual information Y coordinates (26) and corresponding database identifiers (37) are entered. In a second data structure (38), the database identifiers (37) and corresponding database access definitions (35) are entered.

This embodiment of the location coordinates match element (24) could be utilized by selecting a location within the visual information (8) or destination visual information (14) (for example, positioning a cursor at a location in the visual information) to which a computer application in a first step utilizes pixel coordinates to locate the matching, or the closest to matching, visual information X-coordinate (25) and visual information Y-coordinate (26) in the first data structure (36). The corresponding visual information X and Y coordinates (25)(26) are then matched to the database identifier (37). In a second step, the computer application (or a separate application) matches the database identifier (37) to the database access definition (35) in the second data structure (38).

Now referring to FIG. 6, an embodiment of the location coordinates match element (24) matches coordinates (25)(26) in two-dimensional visual information (8) to three dimensions (27)(28)(29) in the computed navigation space (1) (and vice versa) and to a database access definition (35). The visual information X coordinates (25) and the visual information Y coordinates (26) corresponding to the visual information (8) are entered into a data structure (39), which can be (without limiting the invention solely to a rows and columns data structure) a table as shown in FIG. 6. A computed navigations space X coordinate (27), a computed navigations space Y coordinate (28), and a computed navigation space Z coordinate (29) are assigned to each visual information coordinate location (visual information X, visual information Y) in the data structure (39). The database access definition (35) corresponding to the coordinates entered into each row is further entered into the data structure (39). With respect to the data structure (39), as shown by FIGS. 3 and 5 the data structure could be distributed across two or more, but related, data structures.

This embodiment of the location coordinates match element (24) could be utilized by selecting a location within the visual information (8) or destination visual information (14) (for example, positioning the positionably controllable navigation indicator (12) to the coordinate location (13) within the visual information (8)) to which a computer application utilizes pixel coordinates to locate the matching, or the closest to matching, visual information X-coordinate (25) and visual information Y-coordinate (26) in the data structure (39). The determined visual information X and Y coordinates (25)(26) are then matched to computed navigation space coordinates X, Y, Z (27)(28)(29) and the database access definition (35).

The invention further comprises embodiments of the coordinate match element (24) having an algorithm which utilizes, separately or in combination, the image X, Y pixel coordinates, camera focal length, camera geographic coordinates (location of camera on earth's surface when image was captured) and attitude information to create a vector that can be intersected with topographic data (vector or raster) to automatically transform the image x, y pixel coordinates to visual information X, Y coordinates (25)(26) or to computed navigation space coordinates X, Y, Z (27)(28)(29). The derived geographic coordinates can then be used to select a new location for which photographic images will be displayed. The derived geographic coordinates can also be used to show a new location on the map display. The results of such calculations can be stored as part of the system for retrieval as needed, or can be computed on-the-fly as the user interacts with visual information.

Now referring primarily to FIG. 7, an embodiment of the invention can include the steps of accessing the computer application (40), and requesting display of the computed navigation space as a representation within a first visual field of a visual display unit (41). By displaying the computed navigation space as a representation within the first visual field (42), the user can further interact by selecting location coordinates in the computed navigation space (43), thereby displaying visual information spatially referenced to coordinate locations within the computed navigation space from the selected location coordinates within a second visual field (44). The user further interacts by selecting a destination location within the visual information (45), thereby displaying destination visual information spatially referenced to coordinate location within the computed navigation space within a third visual field (46).

Now referring primarily to FIG. 8, an embodiment of the invention can include the steps of accessing the computer application (48), and requesting display of the computed navigation space as a representation within a first visual field of a visual display unit (49). By displaying the computed navigation space as a representation within the first visual field (50). The user can further interact by selecting location coordinates in the representation of computed navigation space (51), thereby displaying visual information spatially referenced to coordinate locations within the computed navigation space from the selected location coordinates within a second visual field (52). The user further interacts by selecting a location within the visual information (53) to provide a visual indication of such location within the representation of the computed navigation space (for example, highlighting or pointing) (54).

Now referring primarily to FIG. 9, an embodiment of the invention can include the steps of accessing the computer application (55), and requesting display of the computed navigation space as a representation within a first visual field of a visual display unit (56) By displaying the computed navigation space as a representation within the first visual field (57). The user can further interact by selecting location coordinates in the representation of computed navigation space (58), thereby displaying visual information spatially referenced to coordinate locations within the computed navigation space from the selected location coordinates in a second visual field (59). The user further interacts by selecting a location within the spatially referenced visual information to access a database to retrieve information regarding the selected location within the visual information (60).

A further example of using a particular embodiment of the invention comprises using the positionably controllable navigation indicator (10) within a geo-planar map (representation (2)) of the computed navigation space (1) in a first visual field (3) in a display (16) is used to select the desired location coordinates (4) (for example by a click). The visual information (8) matched to the location coordinates (4) displays a photographic image or collection of photographic images each taken in a different direction (azimuth) to provide all or a portion of a 360 degree view from an origin geographic location corresponding to the selected location coordinates (4) in the computed navigation space (1). Each of the photographic images (visual information (8)) as discussed above are spatially referenced from the selected location coordinates (4) within the computed navigation space (1) locations (resolved to the pixel level) within the photograph can be related to particular geographic locations (location coordinates (4)) on the geo-planar map (representation (2)).

The user then positions the positionably controllable navigation indicator (12) within a photographic image (visual information (8)) at a location (the location within the photograph can be indicated (in certain embodiments highlighted)) on the geo-planar map (2). The user then selects (clicks) on a location in the photograph to navigate to that destination location within the computed navigation space (1). The destination visual information (14) matched to the destination location coordinates (13) displays a photographic image or collection of photographic images each taken in a different direction (azimuth) to provide all or a portion of a 360 degree view from an origin geographic location corresponding to the selected destination location coordinates (13) in the computed navigation space (1). In this way, the user can navigate to any location on Earth through serial navigation of photographs.

Now referring primarily to FIGS. 10 to 37 describes an implementation of a specific embodiment of the invention providing a geographic computed navigational space (1) displayed as a two dimensional geo-planar map representation (2) having a plurality of selectable location coordinates (4), each upon selection, providing a plurality of geographic images as visual information (8) spatially referenced to the location coordinates (4) within the geographic computed navigational space (1) from the selected location coordinates (4).

Now referring to FIG. 10 a list of tables (for example lists "GeoFlicklink") in the database (6) that can used to implement the above-described invention in a relational database system (RDBMS). The specific example shown utilizes Microsoft Access.

Now referring to FIG. 11 which shows an example schema of a "GeoFlicklink" table generated by selection of the "GeoFlicklink" from the table shown by FIG. 10 which establishes a data structure in which the location of information hyperlinks on geographic movie images utilized by the "GeoFlick" feature of the invention.

Now referring to FIG. 12 which shows an example of the "GeoFlicklink" table populated with data which coordinates the location of information hyperlinks on "GeoFlick" geographic movie images.

Now referring to FIG. 13 which shows an example schema of data structure in which identifies geographic origin location coordinates of each corresponding geographic image, the azimuth of each corresponding geographic image, and the serial order of presentation of each corresponding geographic image within a particular embodiment of the "GeoFlick" invention.

Now referring to FIG. 14 which shows the data structure of FIG. 13 populated with the geographic origin location coordinates of each corresponding geographic image, the azimuth of each corresponding geographic image, and the serial order of presentation of each corresponding geographic image which implements a particular embodiment of the "GeoFlick" invention.

Now referring to FIG. 15 which shows an example schema of the "link" table generated by selection of "link" from the table shown by FIG. 10 which establishes a data structure in which the coordinate locations within geographic images spatially referenced to selectable coordinate locations (4) (or other coordinate locations) within the geographic computed navigation space (1) are matched to hyperlinks to retrieve additional database(s) (18) in accordance with the invention above-described.

Now referring to FIG. 16 which shows an example of the "link" table populated with data which matches coordinate locations within geographic images spatially referenced to selectable coordinate locations (4) (or other coordinate locations) within the geographic computed navigation space (1) to hyperlinks which retrieve additional database(s) (18).

Now referring to FIG. 17 which shows an example schema of a "hyper" table which matches pixel coordinates within geographic images to hyper-navigation links on the geographic images (8) to retrieve destination location identifier to match associated destination location coordinates and destination geographic image (14) in a second data structure ("location table" shown by FIG. 19) and a third data structure ("photo table" shown by FIG. 21). The pixel coordinates data describes the destination location identifier to which the user navigates upon selecting location coordinates (13) by clicking on a location in the geographic image (8).

Now referring to FIG. 18, which provides an example of a populated "hyper" table.

Now referring to FIG. 19 which shows an example schema of the "location" table referred to in FIG. 17 in which geographic coordinates of each destination location identifier are established. This also allows coordinate locations (14) within the geographic image (8) to be displayed on the map.

Now referring to FIG. 20 which shows an example of a populated "location" table.

Now referring to FIG. 21 which provides an example schema of a "photo" table which associates multiple geographic photographic images (8) with a single origin coordinate location referenced to selectable location coordinates (4) within the geographic computed navigation space (1). This allows a user photo location to retrieve geographic photographic images (8) taken in multiple directions from the same location. In some embodiments of the invention, azimuths for each image within a 360 degree view provide directionally bias (19) of a plurality images. In certain embodiments of the invention a single image can make up the entire 360 degree view (or portion thereof). In that embodiment, the azimuth of any pixel location coordinates within the single image can be interpolated provided that the azimuth of an initial pixel location is known.

Now referring to FIG. 22 which provides an example of a populated "photo" table.

Now referring to FIG. 23 which shows a geo-planar representation (2) of the computed navigation space (1) within a first visual field (3). User control buttons (61-63) on the toolbar (64) allows the user manipulate the extent (63) and scale (61)(62) of the geo-planar representation (2) and to operate selectable location coordinates (4) within the geo-planar representation to display visual information (8) in a separate second field by selecting the geo-planar navigation tool (65). By selecting the visual information scaling tool (67), retrieved geographic images can be increased in scale. By selecting representation enlargement tool (61) allows the user to view the representation (2) with higher resolution or by selecting the representation reduction tool (62) allows the user to view the representation with lower resolution. By selecting the geo-planar image indexing tool (63) the user can pan the geo-planar image.

Now referring to FIG. 24 which shows the geo-planar representation (2) of the computed navigational space (1) having the positionably controllable navigation indicator (10) being placed within a specified search tolerance of location coordinates (66) (highlighted in certain embodiments). This can indicate to the user that subsequent selection (click) of the location coordinates (66) will retrieve visual information (8)

spatially referenced to the location coordinates within the computed navigation space (1) from the selected location coordinates (66).

Now referring to FIG. 25 which shows the result of clicking on the selectable location coordinates (66) in the geo-planar representation (2): 1) visual information (8) (geographic photographic image) spatially referenced to location coordinates of the computed navigation space (1) from the selected location coordinates (66) is displayed in the second visual field (9); 2) the visual information can remain linked to location coordinates (66) by a persistent leader line (69). This leader line will remain linked no matter where the second visual field (9) is moved; 3) the arrow (70) indicates the azimuth (directional view) of the image.

Now referring to FIG. 26 which shows positioning of the positionably controllable navigation indicator (12) (the cursor) over the visual information destination location coordinates (13) in the visual information (8) (geographic image) causes the corresponding geo-planar representation destination location coordinates (71) to be highlighted. This can indicate to the user that the destination location coordinates (13) are enabled. By clicking the positionably controllable navigation indicator (12) on the destination location coordinates (13), the user can geographically navigate to the destination location coordinates (13). Pixel coordinates in the destination visual information (14) are spatially referenced to location coordinates in the computed navigation space (1).

Now referring to FIG. 27 shows the result of the user clicking on the positionably controllable navigation indicator (12) as described in the previous figure: 1) an active map image icon is changed to the new location (72); 2) the new location (72) displays a third visual field (15) graphically linked to the new location as shown in the geo-planar representation (2); 3) the third visual field (15) shows an image with an azimuth direction looking back to the originating location, as indicated by the hyper-navigation icon (20); 4) the arrow (70) at the new location (72) indicates the new azimuth direction. This process can be repeated multiple times to hyper-navigate to any location on earth as provided by the image server database.

Now referring to FIGS. 28, 29, and 30 also show the process of hyper-navigation, however they show how the image viewer can have multiple hyper-navigation icons (20) visible for selection by the user.

Now referring to FIG. 29, as in the initial example, show positioning the cursor (positionably controllable navigation indicator (12)) over one of the hyper-navigation icon (20) in the geographic image (8) causes the corresponding geo-planar representation (2) (map view) image icon (72) to be highlighted. In this example, the image viewer shows a ski run on a mountain overlooking a small town. The user has multiple hyper-navigation icon choices that relate to images or features in the town.

Now referring to FIG. 30 which shows the result of clicking the positionably controllable navigation indicator (12) within the geographic image (8) retrieves a destination geographic image (14) which in this specific embodiment of the invention corresponds to a coordinate location in the small town spatially referenced within the computed navigation space (1) from the view direction back toward the selected destination location coordinates (13).

Now referring to FIG. 31 shows a client window which shows that the invention allows for additional visual information to be opened at the same time. Each of the visual fields (15) (22) can be moved independently within the display.

Now referring to FIG. 32 which shows an embodiment of the invention having a visual field (9)(15)(22) with the a directional bias element (19) which allows the user to display multiple views from different azimuth directions around the same geographic origin coordinate location. As the view direction changes a direction arrow (70) on the geoplanar-representation (2) (map image) can also change to reflect the new view direction (azimuth). The opposing arrow directions on the directional bias element (19) allows the view direction to change in a clockwise or counter-clockwise rotation around the geographic origin location coordinates. The directional bias element can be implemented as described above in a plurality of displayed visual information (8) (geographic images) or in a single 360 degree view, as described above.

Now referring to FIG. 33 which shows an example a three step sequence in a clockwise rotation is shown. Each click of the right arrow (73) on the directional bias element (19) increments the view one image frame clockwise. The increment rotation in azimuth (view direction) can be variable based on how the geographic images were originally recorded from the geographic origin location coordinates. As the geographic visual information is directionally biased the view direction arrow (70) in the geo-planar representation (2) can also change.

Now referring primarily to FIG. 34 which shows a visual field which further comprise a temporal bias element (74) allow a plurality of temporally distinct geographic views from the same geographic origin location coordinates to differentiate, for example, seasonal views such as Spring, Summer, Autumn (Fall) and Winter.

Now referring primarily to FIG. 35 the three part sequence in this figure shows how the invention can be implemented for the "GeoFlick" embodiment of the invention. User controls for enlargement (61) and reduction (62) and panning (63) allow manipulation of the geo-planar representation (2). This embodiment of the invention can further include the auto run element (75) to activate an automated sequence of images that move the viewer geographically along a route, in this case a street. The rate of the sequential display can be controlled with the rate biasing element (76). As the directional indication arrow (70) advances along the street the photos change for each location of the arrow. In other embodiments the user would be able to move the cursor along the highlighted path to display the images.

Now referring primarily to FIG. 36 which shows visual information (not to exclude audio) retrievable through selectable location coordinates (13) within images spatially referenced to the computed navigation space (1) from the additional database (18).

Now referring primarily to FIGS. 37A and 37B which show an embodiment of the invention which provides a computed navigation space (1) of a building having selectable location coordinates (4) which retrieves interior building images spatially referenced to the computed navigation space (1) from selected location coordinates.

As can be easily understood from the foregoing, the basic concepts of the present invention may be embodied in a variety of ways. It involves both analysis techniques as well as devices to accomplish the appropriate analysis. In this application, the analysis techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims herein included.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied for support of the claims of this application. It should be understood that any such language changes and broad claiming is herein accomplished. This full patent application is designed to support a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "navigator" should be understood to encompass disclosure of the act of "navigating"—whether explicitly discussed or not and, conversely, were there effectively disclosure of the act of "navigating", such a disclosure should be understood to encompass disclosure of a "navigator" and even a "means for navigating." Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference.

I. U.S. PATENT DOCUMENTS

| DOCUMENT NO | DATE | NAME | CLASS | SUBCLASS | FILING DATE |
|---|---|---|---|---|---|
| 2002/0038180 A1 | Mar. 28, 2002 | Bellesfield, et al. | 701 | 202 | Jul. 10, 2001 |
| 2002/0023271 A1 | Feb. 21, 2002 | Augenbraun, et al. | 725 | 109 | Dec. 15, 2000 |
| 4,086,632 | Apr. 25, 1978 | Liess | 364 | 444 | Sep. 27, 1976 |
| 4,926,336 | May 15, 1990 | Yamada | 364 | 444 | Dec. 27, 1988 |
| 4,937,753 | Jun. 26, 1990 | Yamada | 364 | 449 | Dec. 27, 1988 |
| 4,954,958 | Sep. 04, 1990 | Savage, et al. | 364 | 444 | Aug. 19, 1988 |
| 4,962,468 | Oct. 09, 1990 | Verstraete | 364 | 443 | Aug. 25, 1988 |
| 4,984,168 | Jan. 08, 1991 | Neukrichner, et al. | 364 | 449 | Jan. 04, 1988 |
| 5,031,104 | Jul. 09, 1991 | Ikeda, et al. | 364 | 449 | Nov. 29, 1989 |
| 5,041,983 | Aug. 20, 1991 | Nakahara, et al. | 364 | 449 | Mar. 30, 1990 |
| 5,067,081 | Nov. 19, 1991 | Person | 364 | 444 | Aug. 30, 1989 |
| 5,115,399 | May 19, 1992 | Nimura, et al. | 364 | 449 | Nov. 26, 1990 |
| 5,168,452 | Dec. 01, 1992 | Yamada, et al. | 364 | 449 | Feb. 28, 1991 |
| 5,170,353 | Dec. 08, 1992 | Verstraete | 364 | 449 | Jun. 25, 1991 |
| 5,172,321 | Dec. 15, 1992 | Ghaem, et al. | 364 | 444 | Dec. 10, 1990 |
| 5,191,406 | Mar. 02, 1993 | Brandestini, et al. | 358 | 22 | Nov. 28, 1998 |
| 5,191,532 | Mar. 02, 1993 | Moroto | 364 | 449 | Oct. 09, 1991 |
| 5,189,430 | Feb. 23, 1993 | Yano, et al. | 342 | 457 | Jan. 28, 1992 |
| 5,231,584 | Jul. 27, 1993 | Nimura, et al. | 364 | 444 | Sep. 16, 1991 |
| 5,270,937 | Dec. 14, 1993 | Link, et al. | 364 | 449 | Apr. 26, 1991 |
| 5,274,387 | Dec. 28, 1993 | Kakihara, et al. | G01S 3 | 02 | Jul. 30, 1992 |
| 5,293,163 | Mar. 08, 1994 | Kakihara, et al. | 340 | 995 | Aug. 18, 1993 |
| 5,406,619 | Apr. 11, 1995 | Akhteruzzaman, et al. | 379 | 95 | Mar. 31, 1994 |
| 5,408,217 | Apr. 18, 1995 | Sanderford, Jr. | 348 | 506 | Mar. 21, 1994 |
| 5,414,462 | May 09, 1995 | Veatch | 348 | 135 | Feb. 11, 1993 |
| 5,422,814 | Jun. 06, 1995 | Sprague, et al. | 364 | 449 | Oct. 25, 1993 |
| 5,440,301 | Aug. 08, 1995 | Evans | 348 | 970.11 | Dec. 27, 1993 |
| 5,442,342 | Aug. 15, 1995 | Kung | 340 | 825.34 | May 27, 1993 |
| 5,450,344 | Sep. 12, 1995 | Woo, et al. | 364 | 449 | Apr. 22, 1994 |
| 5,451,757 | Sep. 19, 1995 | Heath, Jr. | 235 | 382 | Apr. 22, 1990 |
| 5,471,392 | Nov. 28, 1995 | Yamashita | 364 | 443 | Jun. 16, 1994 |
| 549929 | Mar. 12, 1996 | Friedmann | 360 | 18 | May 24, 1995 |
| 5,506,644 | Apr. 09, 1996 | Suzuki, et al. | 354 | 106 | Sep. 08, 1994 |

-continued

| | | | | | |
|---|---|---|---|---|---|
| 5,508,736 | Apr. 16, 1996 | Cooper | 348 | 144 | Jun. 15, 1995 |
| 5,521,587 | May 28, 1996 | Sawabe, et al. | 340 | 815.45 | Oct. 28, 1993 |
| 5,523,765 | Jun. 04, 1996 | Ichikawa | 342 | 451 | Jun. 09, 1994 |
| 5,526,291 | Jun. 11, 1996 | Lennen | 364 | 581.82 | Sep. 08, 1994 |
| 5,530,759 | Jun. 25, 1996 | Braudaway, et al. | 380 | 54 | Feb. 01, 1995 |
| 5,535,011 | Jul. 09, 1996 | Yamagami, et al. | 358 | 335 | Mar. 18, 1994 |
| 5,541,845 | Jul. 30, 1996 | Klein | 364 | 449 | Aug. 02, 1994 |
| 5,559,707 | Sep. 24, 1996 | DeLorme, et al. | 364 | 443 | Jan. 31, 1995 |
| 5,768,38 | Jun. 16, 1998 | Rosauer, et al. | 380 | 21 | Sep. 27, 1995 |
| 5,878,421 | Mar. 02, 1999 | Ferrei, et al. | 707 | 100 | Jul. 17, 1995 |
| 6,035,330 | Mar. 07, 2000 | Astiz, et al. | 709 | 218 | Mar. 29, 1996 |
| 6,148,090 | Nov. 14, 2000 | Narioka | 382 | 113 | Nov. 10, 1997 |
| 6,199,014 | Mar. 06, 2001 | Walker, et al. | 701 | 211 | Dec. 23, 1997 |
| 6,240,360 | May 29, 2001 | Phelan | 701 | 208 | Aug. 16, 1996 |
| 6,263,343 | Jul. 17, 2001 | Hirano | 707 | 104 | Jan. 03, 1997 |
| 6,282,362 | Aug. 28, 2001 | Murphy, et al. | 386 | 46 | Oct. 10, 1997 |
| 6,298,303 | Oct. 02, 2001 | Khavakh, et al. | 701 | 289 | Nov. 16, 2000 |
| 6,356,283 | Mar. 12, 2002 | Guedalia | 345 | 760 | Jul. 10, 1998 |
| 5,422,814 | Jun. 06, 1995 | Sprague, et al. | 364 | 449 | Oct. 25, 1993 |

II. FOREIGN PATENT DOCUMENTS

| | | | | | TRANSLATION | |
|---|---|---|---|---|---|---|
| DOCUMENT NO | DATE | COUNTRY | CLASS | SUBCLASS | Yes | No |
| EP 0581659 A1 | 23 Jul. 1993 | Europe | G01C 23 | 00 | | |
| EP 0581659 B1 | 26 Mar. 1997 | Europe | G01C 23 | 00 | | |
| EP 0581659 B1 | 23 Jul. 1993 | Europe | G01C 23 | 00 | | |
| EP 0775891 A2 | 28 May 1997 | Europe | G01C 21 | 20 | | |
| EP 0775891 A3 | 11 Jun. 1997 | Europe | G01C 21 | 20 | | |
| EP 0775891 B1 | 12 May 1999 | Europe | G01C 21 | 20 | | |
| EP 0802516 A2 | 22 Oct. 1997 | Europe | G08G 1 | 0969 | | |
| EP 0841537 A2 | 13 May 1996 | Europe | G01C 21 | 20 | | |
| EP 0841537 A3 | 27 Oct. 1999 | Europe | G01C 21 | 20 | | |
| EP 0845124 A1 | 17 May 2000 | Europe | G06F 17 | 30 | | |
| EP 0845124 B1 | 17 May 2000 | Europe | G06F 17 | 30 | | |
| EP 1004852 A2 | 31 May 2000 | Europe | G01C 21 | 34 | | |
| EP 1004852 A3 | 22 Aug. 2001 | Europe | G01C 21 | 34 | | |
| EP 1024347 A1 | 02 Jun. 2000 | Europe | G01C 21 | 36 | | |
| EP 1118837 A2 | 25 Jul. 2001 | Europe | G01C 21 | 30 | | |
| WO 0144914 A1 | 21 Jun. 2001 | PCT | G06F | 3/0 | | |
| WO 0194882 A2 | 13 Dec. 2001 | PCT | G01C | | | |
| WO 0167200 A2 | 13 Sep. 2001 | PCT | G06F | | | |
| WO 97/07467 | 27 Feb. 1997 | PCT | G06F 17 | 30 | | |
| WO 98/0976 | 08 Jan. 1998 | PCT | H04N7 | 173 | | |

III. OTHER DOCUMENTS (Including Author, title, Date, Pertinent Pages, Etc.)

"MSN MapPoint - Home Page", http://www.mappoint.com, printed May 3, 2002, 1 page
"Internet Pictures Corporation - World Leader in Dynamic Imaging", wysisyg://85/http://www.ipix.com, printed May 3, 2002, 1 page
"Red Hen Systems, Inc. - Home", wysiwyg://87/http:://www.redhensystems.com/, printed May 3, 2002, 1 page
"GlobeXplorer", wysiwyg:3/http://www.globexplorer.com, printed May 5, 2002, 1 page
"S.N.V.", http://www.snv.fr, printed May 3, 2002, 1 page
"Realator.Org Home Page", wysiwyg://10/http://www.realtor.org . . . gn.nsf/pages/HomePage?OpenDocument, printed May 3, 2002, 1 page
"Orbitz: Airline Tickets, Hotels, Car Rentals, Travel Deals", wysiwyg://15/http://www.orbitz.com, printed May 3, 2002, 1 page
"Expedia Travel -- discount airfare . . . , vacation packages, cruises, maps", http://www.expedia.com/Default.asp, printed May 3, 2002, 1 page
"24/7 Travel Professionals - Trip.com - 1.800.TRIP.COM", wysiwyg://29./http://www.trip.com./trs.trip/home/index_01.xsl, printed May 3, 2002, 2 pages Thus, the applicants should be understood to claim at least: i) each of the computed navigation systems as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed, xi) processes performed with the aid of or on a computer as described throughout the above discussion, xii) a programmable apparatus as described throughout the above discussion, xiii) a computer readable memory encoded with data to direct a computer comprising means or elements which function as described throughout the above discussion, xiv) a computer configured as herein disclosed and described, xv) individual or combined subroutines and programs as herein disclosed and described, xvi) the related methods disclosed and described, xvii) similar, equivalent, and even implicit variations of each of these systems and methods, xviii) those alternative designs which accomplish each of the functions shown as are disclosed and described, xix) those alternative designs and methods which accomplish each of the functions shown as are implicit to accomplish that which is disclosed and described, xx) each feature, component, and step shown as separate and independent inventions, xxi) the various combinations and permutations of each of the above, and xxii) each potentially dependent claim or concept as a dependency on each and every one of the independent claims or concepts presented.

It should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 U.S.C §132 or other such laws—to permit the addition of any of the various dependencies or other elements presented under one independent claim or concept as dependencies or elements under any other independent claim or concept.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

We claim:

1. A computer-implemented method comprising:
   displaying a representation of a map and a controllable directional indicator in the representation of the map;
   receiving an input indicating a direction of the controllable directional indicator;
   displaying a first image comprising a view from a first location in the map and in the direction indicated by the controllable directional indicator;
   receiving an indication of a selection of a point within the first image, the point within the first image corresponding to a second location within the map; and
   displaying a second image comprising a view from the second location.

2. The method of claim 1, further comprising:
   displaying, within the representation of the map, an indication of map coordinates of the second location.

3. The method of claim 1, further comprising:
   receiving an indication of a selection of a point within the second image, the point within the second image corresponding to a third location.

4. The method of claim 3, further comprising:
   displaying a third image comprising a view from the third location.

5. A computer-readable medium having instructions embodied thereon, the instructions comprising:
   instructions to display a representation of a map and a controllable directional indicator in the representation of the map;
   instructions to receive an input indicating a direction of the controllable directional indicator;
   instructions to display a first image comprising a view from a first location in the map and in the direction indicated by the controllable directional indicator;
   instructions to receive an indication of a selection of a point within the first image, the point within the first image corresponding to a second location within the map; and
   instructions to display a second image comprising a view from the second location.

6. The computer-readable medium of claim 5, the instructions further comprising:
   instructions to display, within the representation of the map, an indication of map coordinates of the second location.

7. The computer-readable medium of claim 5, the instructions further comprising:
   instructions to receive an indication of a selection of a point within the second image, the point within the second image corresponding to a third location; and
   instructions to display a third image comprising a view from the third location.

8. A system comprising:
   one or more display devices configured to display a representation of a map and a controllable directional indicator in the representation of the map; and
   one or more computing devices configured to receive an input indicating a direction of the controllable directional indicator;
   wherein the one or more display devices are further configured to display a first image comprising a view from a first location in the map and in the direction indicated by the controllable directional indicator; and
   wherein the one or more computing devices are further configured to receive an indication of a selection of a point within a displayed first image, the point within the first image corresponding to a second location within a geographic area;
   wherein the one or more display devices are further configured to display a second image comprising a view from the second location.

9. The system of claim 8, wherein the one or more displays are further configured to display, within the representation of the map, an indication of map coordinates of the second location.

10. The system of claim 8, wherein:
the one or more computing devices are further configured to receive an indication of a selection of a point within the second image, the point within the second image corresponding to a third location; and
the one or more display devices are further configured to display a third image comprising a view from the third location.

11. A system comprising:
means for displaying a representation of a map and a controllable directional indicator in the representation of the map;
means for receiving an input indicating a direction of the controllable directional indicator;
means for displaying a first image comprising a view from a first location in the map and in the direction indicated by the controllable directional indicator;
means for receiving an indication of a selection of a point within the first image, the point within the first image corresponding to a second location, the second location corresponding to destination location within the map; and
means for displaying a second image comprising a view from the second location.

12. The system of claim 11, further comprising:
means for displaying, within the representation of the map, an indication of map coordinates of the second location.

13. The system of claim 11, further comprising:
means for receiving an indication of a selection of a point within the second image, the point within the second image corresponding to a third location; and
means for displaying a third image comprising a view from the third location.

14. A computer-implemented method comprising:
displaying a representation of a map;
receiving a first indication, the first indication representative of a first selected location in the representation of the map;
displaying, in the representation of the map, an indication of the first selected location;
displaying, in the representation of the map, a controllable directional indicator from the indication of the first selected location;
receiving an input indicating a direction of the controllable directional indicator;
displaying an image, wherein the image is selected based on a view from a location corresponding to the first selected location and in a direction corresponding to the direction indicated by the controllable directional indicator;
receiving a second indication, the second indication representative of a selection of a point within the image, the point within the image corresponding to a second selected location; and
displaying, in the map, an indication of a location corresponding to the second selected location.

15. The method of claim 14, wherein displaying the representation of the map comprises displaying a plurality of target locations, wherein the first selected location is one of the plurality of target locations.

16. The method of claim 15, further comprising:
highlighting the first selected location in response to receiving the first indication.

17. A computer-readable medium having instructions embodied thereon, the instructions comprising:
instructions to display a representation of a map;
instructions to receive a first indication, the first indication representative of a first selected location in the representation of the map;
instructions to display, in the representation of the map, an indication of the first selected location;
instructions to display, in the representation of the map, a controllable directional indicator from the indication of the first selected location;
instructions to receive an input indicating a direction of the controllable directional indicator;
instructions to display an image, wherein the image is selected based on a view from a location corresponding to the first selected location and in a direction corresponding to the direction indicated by the controllable directional indicator;
instructions to receive a second indication, the second indication representative of a selection of a point within the image, the point within the image corresponding to a second selected location; and
instructions to display, in the map, an indication of a location corresponding to the second selected location.

18. The computer-readable medium of claim 17, wherein the instructions to display the representation of the map comprise instructions to display a plurality of target locations, wherein the first selected location is one of the plurality of target locations.

19. The computer-readable medium of claim 18, the instructions further comprising:
instructions to highlight the first selected location in response to receiving the first indication.

20. A system comprising:
one or more computing devices configured to:
receive a first indication, the first indication representative of a first selected location in a representation of a map,
receive an input indicating a direction of a controllable directional indicator, and
receive a second indication, the second indication representative of a selection of a point within an image, the point within the image corresponding to a second selected location; and
one or more display devices configured to:
display the representation of the map,
display, in the representation of the map, an indication of the first selected location,
display, in the representation of the map, the controllable directional indicator from the indication of the first selected location,
display the image, wherein the image is selected based on a view from a location corresponding to the first selected location and in a direction corresponding to the direction indicated by the controllable directional indicator, and
display, in the map, an indication of a location corresponding to the second selected location.

21. The system of claim 20, wherein the one or more display devices are configured to display a plurality of target locations in the representation of the map, wherein the first selected location is one of the plurality of target locations.

22. The system of claim 21, wherein the one or more display devices are configured to highlight the first selected location in response to the one or more computing devices receiving the first indication.

23. A system comprising:
  means for displaying a representation of a map;
  means for receiving a first indication, the first indication representative of a first selected location in the representation of the map;
  means for displaying, in the representation of the map, an indication of the first selected location;
  means for displaying, in the representation of the map, a controllable directional indicator from the indication of the first selected location;
  means for receiving an input indicating a direction of the controllable directional indicator;
  means for displaying an image, wherein the image is selected based on a view from a location corresponding to the first selected location and in a direction corresponding to the direction indicated by the controllable directional indicator;
  means for receiving a second indication, the second indication representative of a selection of a point within the image, the point within the image corresponding to a second selected location; and
  means for displaying, in the map, an indication of a location corresponding to the second selected location.

24. The system of claim 23, wherein the means for displaying the representation of the map comprises means for displaying a plurality of target locations, wherein the first selected location is one of the plurality of target locations.

25. The system of claim 24, further comprising:
  means for highlighting the first selected location in response to receiving the first indication.

26. A computer-implemented method comprising:
  displaying a representation of a map and a controllable directional indicator in the representation of the map;
  receiving a first indication, the first indication representative of a first selected location in the representation of the map;
  receiving an input indicating a direction of the controllable directional indicator;
  determining one or more selectable destination locations in the representation of the map, wherein the one or more selectable destination locations are in a direction from the first selected location corresponding to the direction indicated by the controllable directional indicator; and
  displaying, in the map, the one or more selectable destination locations.

27. The method of claim 26, further comprising:
  receiving a second indication, the second indication representative of a second selected location, the second selected location being one of the one or more selectable destination locations in the map; and
  displaying an image, wherein the image is selected based on the direction and based on a view from a location corresponding to the second selected location.

28. The method of claim 27, further comprising:
  receiving a third indication, the third indication representative of a third selected location in the image; and
  displaying, in the map, an indication of a location corresponding to the third selected location in the image.

29. A computer-readable medium having instructions embodied thereon, the instructions comprising:
  instructions to display a representation of a map and a controllable directional indicator in the representation of the map;
  instructions to receive a first indication, the first indication representative of a first selected location in the representation of the map;
  instructions to receive an input indicating a direction of the controllable directional indicator;
  instructions to determine one or more selectable destination locations in the representation of the map, wherein the one or more selectable destination locations are in a direction from the first selected location corresponding to the direction indicated by the controllable directional indicator; and
  instructions to display, in the map, the one or more selectable destination locations.

30. The computer-readable medium of claim 29, the instructions further comprising:
  instructions to receive a second indication, the second indication representative of a second selected location, the second selected location being one of the one or more selectable destination locations in the map; and
  instructions to display an image, wherein the image is selected based on the direction and based on a view from a location corresponding to the second selected location.

31. The computer-readable medium of claim 30, the instructions further comprising:
  instructions to receive a third indication, the third indication representative of a third selected location in the image; and
  instructions to display, in the map, an indication of a location corresponding to the third selected location in the image.

32. A system comprising:
  one or more display devices configured to:
    display a representation of a map and a controllable directional indicator in the representation of the map,
    display, in the map, one or more selectable destination locations, and
  one or more computing devices configured to:
    receive a first indication, the first indication representative of a first selected location in the representation of the map,
    receive an input indicating a direction of the controllable directional indicator, and
    determine the one or more selectable destination locations, wherein the one or more selectable destination locations are in a direction from the first selected location corresponding to the direction indicated by the controllable directional indicator.

33. The system of claim 32, wherein:
  the one or more computing devices are further configured to receive a second indication, the second indication representative of a second selected location, the second selected location being one of the one or more selectable destination locations in the map; and
  the one or more display devices are configured to display an image, wherein the image is selected based on the direction and based on a view from a location corresponding to the second selected location.

34. The system of claim 33, wherein:
  the one or more computing devices are further configured to receive a third indication, the third indication representative of a third selected location in the image; and
  the one or more display devices are configured to display, in the map, an indication of a location corresponding to the third selected location in the image.

35. A system comprising:
  means for displaying a representation of a map and a controllable directional indicator in the representation of the map;

means for receiving a first indication, the first indication representative of a first selected location in the representation of the map;

means for receiving an input indicating a direction of the controllable directional indicator;

means for determining one or more selectable destination locations in the representation of the map, wherein the one or more selectable destination locations are in a direction from the first selected location corresponding to the direction indicated by the controllable directional indicator; and means for displaying, in the map, the one or more selectable destination locations.

36. The system of claim 35, further comprising:

means for receiving a second indication, the second indication representative of a second selected location, the second selected location being one of the one or more selectable destination locations in the map; and means for displaying an image, wherein the image is selected based on the direction and based on a view from a location corresponding to the second selected location.

37. The system of claim 36, further comprising:

means for receiving a third indication, the third indication representative of a third selected location in the image; and means for displaying, in the map, an indication of a location corresponding to the third selected location in the image.

* * * * *